United States Patent
Yamada et al.

(10) Patent No.: US 6,922,185 B2
(45) Date of Patent: Jul. 26, 2005

(54) INPUTTING DEVICE AND ELECTRONIC INSTRUMENT USING THIS INPUTTING DEVICE AND INPUTTING METHOD THEREOF

(75) Inventors: Yoshiaki Yamada, Tokyo (JP); Michio Nagai, Tokyo (JP); Midori Tanaka, Tokyo (JP); Yoko Arimitsu, Tokyo (JP); Tatsuya Uchikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 335 days.

(21) Appl. No.: 10/202,874

(22) Filed: Jul. 26, 2002

(65) Prior Publication Data

US 2003/0025669 A1 Feb. 6, 2003

(30) Foreign Application Priority Data

Aug. 3, 2001 (JP) ........................................ 2001-236351

(51) Int. Cl.[7] ................................................. G09G 5/00
(52) U.S. Cl. ........................ 345/157; 345/156; 345/159; 345/160
(58) Field of Search ................................ 345/157, 156, 345/159, 160; 307/112, 116

(56) References Cited

U.S. PATENT DOCUMENTS 5,367,199 A * 11/1994 Lefkowitz et al. .......... 307/116
5,428,367 A * 6/1995 Mikan ......................... 345/157
5,508,719 A * 4/1996 Gervais ....................... 345/157
5,657,012 A * 8/1997 Tait .............................. 341/20

FOREIGN PATENT DOCUMENTS

| FR | 2654233 | * | 5/1991 |
| JP | 359081728 A | * | 5/1984 |
| JP | 4-125723 | | 4/1992 |
| JP | 2001-51789 | | 2/2001 |

* cited by examiner

Primary Examiner—Vijay Shankar
Assistant Examiner—Leonid Shapiro
(74) Attorney, Agent, or Firm—Young & Thompson

(57) ABSTRACT

An inputting device, an electronic instrument using this inputting device, and an inputting method thereof, in which displacement of an operating section in the direction slanting for the X or the Y direction is detected and the movement of a moving object such as a cursor on a display can be controlled easily and precisely, are provided. The operating section is displaced about in the horizontal direction and the vertical direction for a plane being almost parallel to the surface of a cabinet. In case that orthogonal coordinates having the X axis and the Y axis are set on the plane being almost parallel to the surface of the cabinet, horizontal direction sensors detect the displacement of the operating section in the direction slanting for the X or Y direction, in addition to in the X or Y direction. The cursor moves on the display based on the displacement of the operating section about in the horizontal direction. Information being selected by the cursor on the display is decided by the displacement of the operating section about in the vertical direction.

31 Claims, 28 Drawing Sheets

FIG. 3
(a)
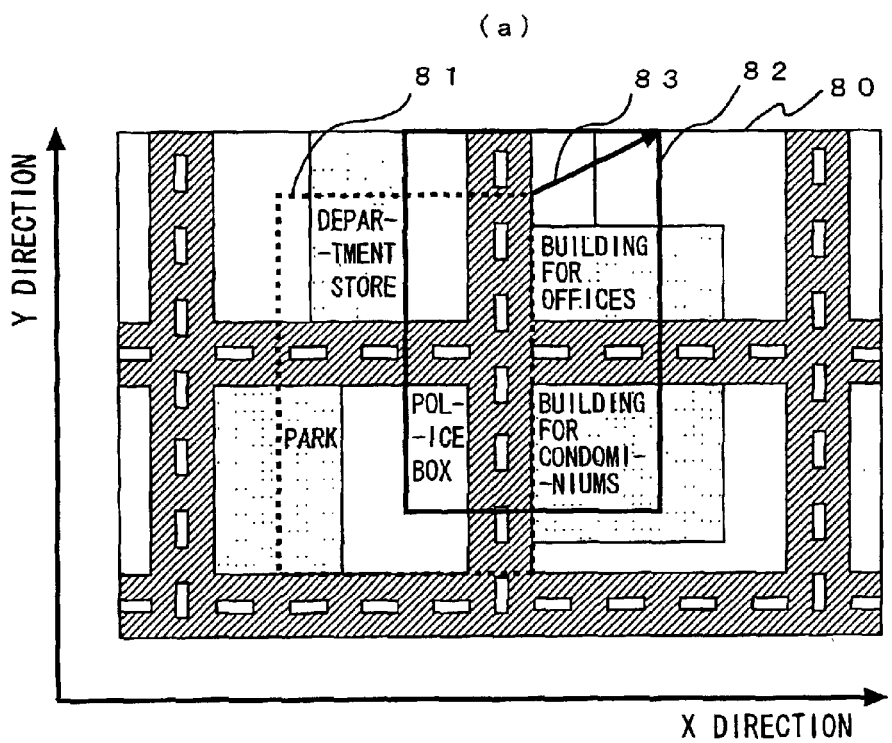
(b)
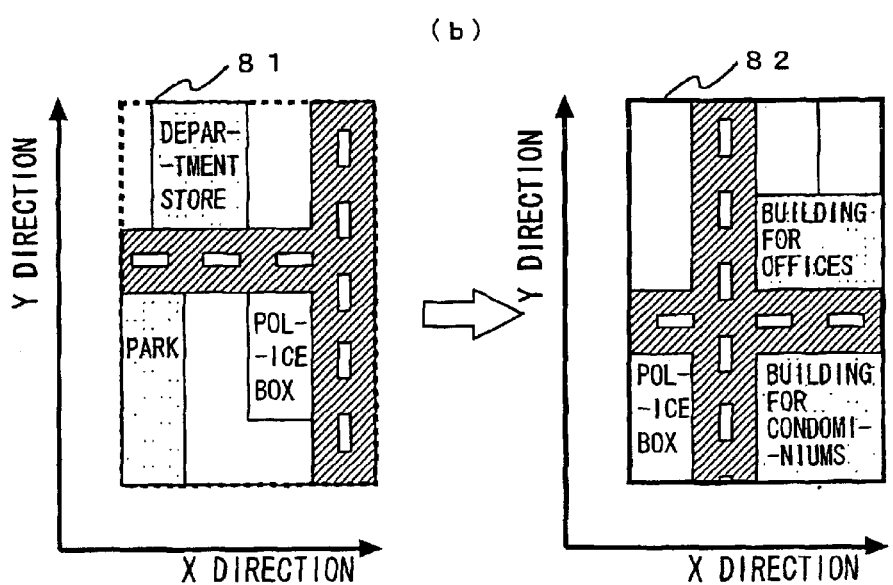

INPUTTING DEVICE AND ELECTRONIC INSTRUMENT USING THIS INPUTTING DEVICE AND INPUTTING METHOD THEREOF

BACKGROUND OF THE INVENTION

The present invention relates to an inputting device and an electronic instrument such as a mobile communication terminal using this inputting device and an inputting method thereof, in particular, in which an operating section, which is displaced about in the horizontal and vertical directions for the plane being almost parallel to the surface of the cabinet of the electronic instrument, is provided, and the displacement of the operating section, in the slanting direction in the plane being almost parallel to the surface of the cabinet of the electronic instrument, is detected.

DESCRIPTION OF THE RELATED ART

Recently, an inputting device, whose purposes are to improve operation ability and to save space, has been developed and widely used for electronic instruments such as a personal computer (PC) and a mobile communication terminal. As a first conventional example, Japanese Patent Application Laid-Open No. 2001-51789 has disclosed a pointing device. In this patent application, an operating component is slid in the concave part formed on the upper surface of its cabinet, and the position of the pointer on the display is designated, based on pressure by the operating component to strain gauges, disposed at regions surrounding the concave part.

As a second conventional example, Japanese Patent Application Laid-Open No. HEI 4-125723 has disclosed a pointing control device. In this patent application, a moved amount per unit time of a slider, which slides on a supporting component, is detected by magnetic resistance elements, and the movement of the pointer on the display is controlled by the detected moved amount of the slider.

However, at the first conventional example, the pressure by the operating component to the strain gauges can be detected in the X and Y directions on the X and Y coordinate surface being the plane parallel to the upper surface of the cabinet. But the pressure in the direction slanting for the X and Y directions cannot be detected. Therefore, there is a problem that the operation ability is lowered.

And at the second conventional example, a voltage, outputted corresponding to the momentum of the slider in the X and Y directions, is detected, and a moving signal for the pointer, which corresponds to the acceleration of the pointer, is outputted, based on the detected output voltage. Consequently, there is a problem that operation becomes difficult when the cursor is moved in the slanting direction one scale unit by one scale unit on the display.

SUMMARY OF THE INVENTION

It is therefore an object of the present invention to provide an inputting device and an electronic instrument such as a mobile communication terminal using this inputting device and an inputting method thereof, in which an operating section, which moves about in the horizontal and vertical directions for the plane being almost parallel to the surface of the cabinet of the electronic instrument, is provided, and the displacement of the operating section, in the slanting direction in the plane being almost parallel to the surface of the cabinet of the electronic instrument, is detected, and the movement of a moving object such as a cursor on a display can be controlled easily and precisely.

According to a first aspect of the present invention, for achieving the object mentioned above, there is provided an inputting device. The inputting device provides a first operating means, which is disposed on a surface having almost the same level of the surface of a cabinet and is displaced about in the horizontal direction along a plane being almost parallel to the surface of the cabinet and also is displaced about in the vertical direction for the surface of the cabinet. In case that orthogonal coordinates having X axis and Y axis are set on the plane being almost parallel to the surface of the cabinet, the inputting device further provides a displacement detecting means, which detects displacement of the first operating means in the X or Y direction and in the direction slanting for the X or Y direction as the origin of the orthogonal coordinates is made to be the reference, and a signal outputting means, which outputs designated signals based on the displacement of the first operating section detected by the displacement detecting means.

According to a second aspect of the present invention, in the first aspect, the displacement detecting means detects the displacement of the first operating means about in the horizontal direction by one of sensors disposed in the X direction and the Y direction and in the direction slanting for the X direction and the Y direction as the origin is made to be the reference.

According to a third aspect of the present invention, in the first aspect, the first operating means provides a displacing part, in which a part displacing about in the horizontal direction and a part displacing about in the vertical direction are unified, and the part displacing about in the horizontal direction and the part displacing about in the vertical direction are displaced independently of each other.

According to a fourth aspect of the present invention, in the first aspect, the first operating means provides a part displacing about in the horizontal direction and a part displacing about in the vertical direction separately, and the part displacing about in the horizontal direction and the part displacing about in the vertical direction are displaced independently of each other.

According to a fifth aspect of the present invention, in the first aspect, the displacement detecting means is disposed in each of the plural directions on a plane being almost parallel to the surface of the cabinet as the origin is made to be the reference, and detects the displacement of the first operating means about in the horizontal direction by contacting the first operating means.

According to a sixth aspect of the present invention, in the first aspect, the inputting device further provides a second operating means, which is disposed on the surface having almost the same level of the surface of the cabinet and has plural parts displacing about in the vertical direction independently of one another for the surface of the cabinet.

According to a seventh aspect of the present invention, in the sixth aspect, the displacement detecting means decides whether the contact by the first operating means with the displacement detecting means is detected or not, based on displacement of the second operating means about in the vertical direction.

According to an eighth aspect of the present invention, in the first aspect, the inputting device further provides an origin returning means, which makes the center of the first operating means return to the origin, in case that force about in the horizontal direction is not being applied to the first operating means.

According to a ninth aspect of the present invention, in the eighth aspect, the origin returning means makes the center of the first operating means return to the origin by using at least one elastic component having elastic force adhered to the first operating means.

According to a tenth aspect of the present invention, there is provided an electronic instrument. The electronic instrument provides a first operating means, which is disposed on a surface having almost the same level of the surface of a cabinet and is displaced about in the horizontal direction along a plane being almost parallel to the surface of the cabinet and also is displaced about in the vertical direction for the surface of the cabinet. In case that orthogonal coordinates having X axis and Y axis are set on the plane being almost parallel to the surface of the cabinet, the electronic instrument further provides a displacement detecting means, which detects displacement of the first operating means in the X or Y direction and in the direction slanting for the X or Y direction as the origin of the orthogonal coordinates is made to be the reference, a displaying means, which displays information, and a controlling means, which controls a moving object on the displaying means based on the direction of the displacement of the first operating means detected by the displacement detecting means.

According to an eleventh aspect of the present invention, in the tenth aspect, the displacement detecting means detects the displacement of the first operating means about in the horizontal direction by one of sensors disposed in the X direction and the Y direction and in the direction slanting for the X direction and the Y direction as the origin is made to be the reference.

According to a twelfth aspect of the present invention, in the tenth aspect, the first operating means provides a displacing part, in which a part displacing about in the horizontal direction and a part displacing about in the vertical direction are unified, and the part displacing about in the horizontal direction and the part displacing about in the vertical direction are displaced independently of each other.

According to a, thirteenth aspect of the present invention, in the tenth aspect, the first operating means provides a part displacing about in the horizontal direction and a part displacing about in the vertical direction separately, and the part displacing about in the horizontal direction and the part displacing about in the vertical direction are displaced independently of each other.

According to a fourteenth aspect of the present invention, in the tenth aspect, the displacement detecting means is disposed in each of the plural directions on a plane being almost parallel to the surface of the cabinet as the origin is made to be the reference, and detects the displacement of the first operating means about in the horizontal direction by contacting the first operating means.

According to a fifteenth aspect of the present invention, in the fourteenth aspect, the controlling means decides moving velocity of the moving object based on the size of the displacement of the first operating means detected by the displacement detecting means.

According to a sixteenth aspect of the present invention, in the tenth aspect, the electronic instrument further provides a second operating means, which is disposed on the surface having almost the same level of the surface of the cabinet and has plural parts displacing about in the vertical direction independently of one another for the surface of the cabinet.

According to a seventeenth aspect of the present invention, in the sixteenth aspect, in case that the moving object is a cursor being displayed on the displaying means, the controlling means makes the cursor move in an arbitrary direction on the displaying means based on the displacement of the first operating means about in the horizontal direction or based on the displacement of the second operating means about in the vertical direction, and the controlling means decides information on the displaying means being selected by the cursor based on the displacement of the first operating means about in the vertical direction or based on the displacement of the second operating means about in the vertical direction.

According to an eighteenth aspect of the present invention, in the sixteenth aspect, in case that the moving object is a total screen being displayed on the displaying means, the controlling means makes the total screen scroll in an arbitrary direction on the displaying means based on the displacement of the first operating means about in the horizontal direction or based on the displacement of the second operating means about in the vertical direction, and the controlling means decides a screen in the total screen on the displaying means being scrolled in the arbitrary direction based on the displacement of the first operating means about in the vertical direction or based on the displacement of the second operating means about in the vertical direction.

According to a nineteenth aspect of the present invention, in the sixteenth aspect, the controlling means changes screen information to be displayed on the displaying means based on the displacement of the first operating means about in the horizontal direction or based on the displacement of the second operating means about in the vertical direction.

According to a twentieth aspect of the present invention, in the sixteenth aspect, the displacement detecting means decides whether the contact by the first operating means with the displacement detecting means is detected or not, based on displacement of the second operating means about in the vertical direction.

According to a twenty-first aspect of the present invention, in the sixteenth aspect, in case that plural moving objects exist, the controlling means allocates each of the plural moving objects to be moved to the first operating means and the second operating means separately based on information contents to be displayed on the displaying means.

According to a twenty-second aspect of the present invention, in the tenth aspect, the electronic instrument further provides an origin returning means, which makes the center of the first operating means return to the origin, in case that force about in the horizontal direction is not being applied to the first operating means.

According to a twenty-third aspect of the present invention, in the twenty-second aspect, the origin returning means makes the center of the first operating means return to the origin by using at least one elastic component having elastic force adhered to the first operating means.

According to a twenty-fourth aspect of the present invention, there is provided an inputting method of information, by using a first operating section, which is disposed on a surface having almost the same level of the surface of a cabinet and is displaced on the surface having almost the same level of the surface of the cabinet, and also by using a displaying section, which displays information. The inputting method of information provides the step of, displacing the first operating section along a plane being almost parallel to the surface of the cabinet about in the horizontal direction, and displacing the first operating section about in the vertical direction for the surface of the cabinet. In case that orthogonal coordinates having X axis and Y axis are set on the plane being almost parallel to the surface of the cabinet, the inputting method further provides the steps of, detecting displacement of the first operating section in the X or Y direction and in the direction slanting for the X or Y direction as the origin of the orthogonal coordinates is made to be the reference, and controlling a moving object on the displaying section based on the detected direction of the displacement of the first operating section.

According to a twenty-fifth aspect of the present invention, in the twenty-fourth aspect, the detecting the displacement of the first operating section about in the horizontal direction is executed by using one of sensors disposed in the X direction and the Y direction and in the direction slanting for the X direction and the Y direction as the origin is made to be the reference.

According to a twenty-sixth aspect of the present invention, in the twenty-fourth aspect, the displacing the first operating section is executed by displacing the first operating section, in which a part displacing about in the horizontal direction and a part displacing about in the vertical direction are unified and the part displacing about in the horizontal direction and the part displacing about in the vertical direction are displaced independently of each other.

According to a twenty-seventh aspect of the present invention, in the twenty-fourth aspect, the displacing the first operating section is executed by displacing the first operating section, in which a part displacing about in the horizontal direction and a part displacing about in the vertical direction exist separately, and the part displacing about in the horizontal direction and the part displacing about in the vertical direction are displaced independently of each other.

According to a twenty-eighth aspect of the present invention, in the twenty-fourth aspect, the detecting the displacement of the first operating section about in the horizontal direction is executed by that each of displacement detecting sections, disposed in the plural directions on a plane being almost parallel to the surface of the cabinet as the origin is made to be the reference, contacts the first operating section.

According to a twenty-ninth aspect of the present invention, the controlling the moving object decides moving velocity of the moving object based on the size of the detected displacement of the first operating section.

According to a thirtieth aspect of the present invention, in the twenty-fourth aspect, the inputting method of information further provides the step of, displacing a second operating section, which is disposed on the surface having almost the same level of the surface of the cabinet and has plural parts displacing about in the vertical direction independently of one another for the surface of the cabinet.

According to a thirty-first aspect of the present invention, in the thirtieth aspect, in case that the moving object is a cursor being displayed on the displaying section, the controlling the moving object makes the cursor move in an arbitrary direction on the displaying section based on the displacement of the first operating section about in the horizontal direction or based on the displacement of the second operating section about in the vertical direction, and the controlling the moving object decides information on the displaying section being selected by the cursor based on the displacement of the first operating section about in the vertical direction or based on the displacement of the second operating section about in the vertical direction.

According to a thirty-second aspect of the present invention, in the thirtieth aspect, in case that the moving object is a total screen being displayed on the displaying section, the controlling the moving object makes the total screen scroll in an arbitrary direction on the displaying section based on the displacement of the first operating section about in the horizontal direction or based on the displacement of the second operating section about in the vertical direction, and the controlling the moving object decides a screen in the total screen on the displaying section being scrolled in the arbitrary direction based on the displacement of the first operating section about in the vertical direction or based on the displacement of the second operating section about in the vertical direction.

According to a thirty-third aspect of the present invention, in the thirtieth aspect, the controlling the moving object changes screen information to be displayed on the displaying section based on the displacement of the first operating section about in the horizontal direction or based on the displacement of the second operating section about in the vertical direction.

According to a thirty-fourth aspect of the present invention, in the thirtieth aspect, the detecting the displacement decides whether the contact by the first operating section with one of the displacement detecting sections is detected or not, based on displacement of the second operating section about in the vertical direction.

According to a thirty-fifth aspect of the present invention, in the thirtieth aspect, in case that plural moving objects exist, the controlling the moving object allocates each of the plural moving objects to be moved to the first operating section and the second operating section separately based on information contents to be displayed on the displaying section.

According to a thirty-sixth aspect, the inputting method of information further provides the step of, returning to the origin, which makes the center of the first operating section return to the origin, in case that force about in the horizontal direction is not being applied to the first operating section.

According to a thirty-seventh aspect, in the thirty-sixth aspect, the returning to the origin makes the center of the first operating section return to the origin by using at least one elastic component having elastic force adhered to the first operating section.

BRIEF DESCRIPTION OF THE DRAWINGS

The objects and features of the present invention will become more apparent from the consideration of the following detailed description taken in conjunction with the accompanying drawings in which:

FIG. 3 is a diagram showing screen information displaying on the screen in the display at the first embodiment of the electronic instrument of the present invention;

DESCRIPTION OF THE PREFERRED EMBODIMENTS

Figure 1:
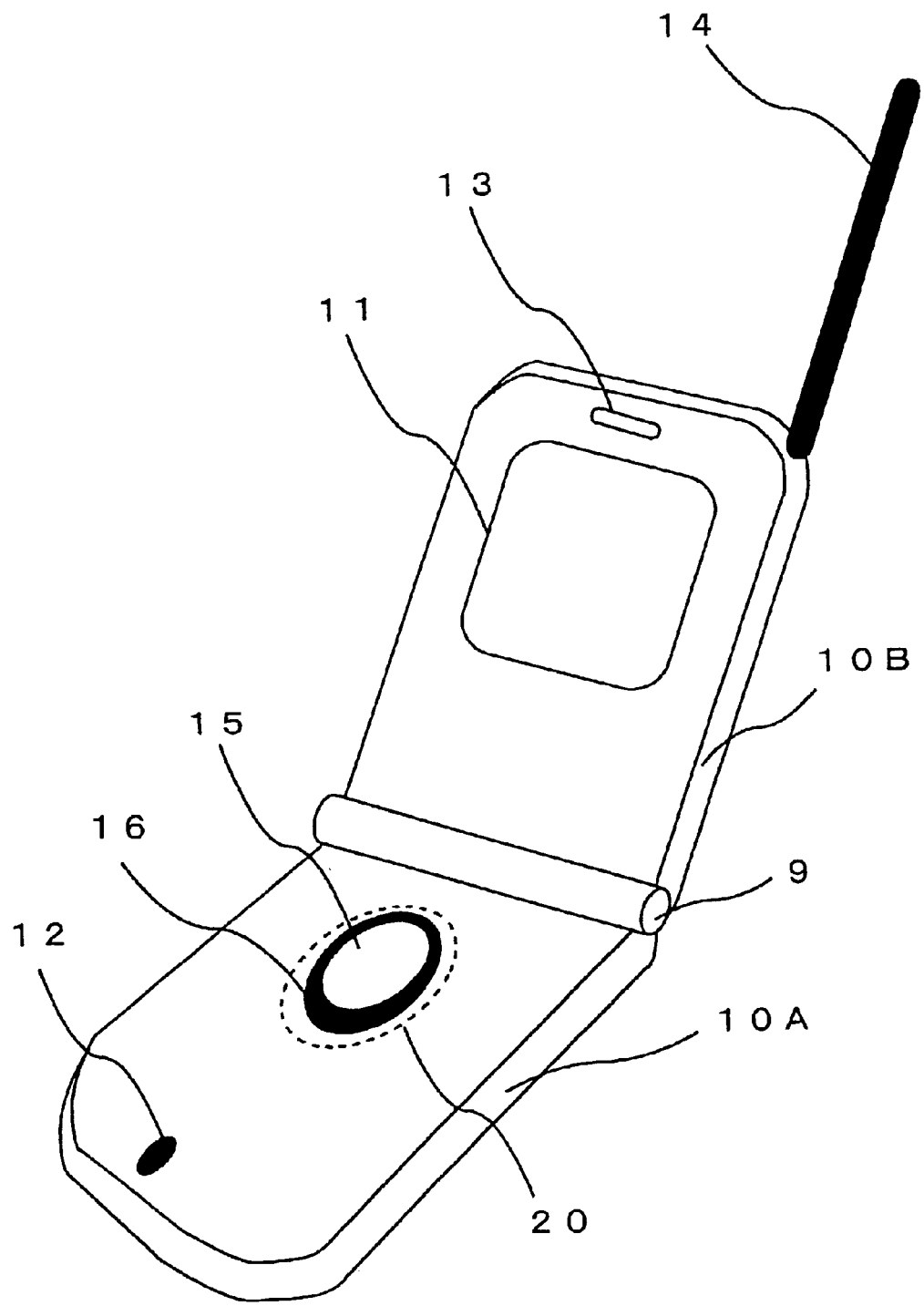
FIG. 1 is a perspective view showing an electronic instrument using an inputting device at a first embodiment of the present invention.

Referring now to the drawings, embodiments of the present invention are explained in detail. FIG. 1 is a perspective view showing an electronic instrument using an inputting device at a first embodiment of the present invention. In FIG. 1, a mobile communication terminal is shown as the electronic instrument. The mobile communication terminal is a foldable type mobile communication terminal such as a cellular phone, a terminal for the personal handy-phone system (PHS) and a terminal for the personal digital assistants (PDA). However, the electronic instrument is not limited to the foldable mobile communication terminal, and the present invention can be applied to any electronic instrument having a display.

As shown in FIG. 1, the electronic instrument at the first embodiment of the present invention provides a first cabinet 10A, a second cabinet 10B, and a hinge 9 for connecting the first cabinet 10A to the second cabinet 10B. An inputting device 20 and a microphone 12 are provided in the first cabinet 10A. A display 11, a speaker 13, and an antenna 14 are provided in the second cabinet 10B. Further, on the first cabinet 10A, a concave part (hereinafter referred to as an operating region 16) is provided and this operating region 16 is a part of the inputting device 20. The inputting device 20 provides an operating section 15 and the operating region 16.

The display 11 displays various kinds of information such as characters, still images, and moving pictures. And on the display 11, a cursor (pointer), which specifies or selects information, a region, or an item on the display 11, is displayed. And information displayed on the display 11 can be moved on the display 11. That is, the information on the display 11 can be scrolled.

Voice information is inputted to the microphone 12, and voice information is outputted from the speaker 13. Signals are received and transmitted at the antenna 14.

The bottom surface of the operating section 15 has a smaller area than the area of the operating region 16, and moves horizontally in the all directions in the operating region 16, along the plane being almost parallel to the surface of the first cabinet 10A. And the origin, where the moved amount of the operating section 15 is judged to be "0", is decided at a designated position in the operating region 16. When force for making the operating section 15 move horizontally has not been applied from the outside, the center of the operating section 15 is positioned at the origin. And after the operating section 15 moved to a position except the origin in the operating region 16, when force for keeping the operating section 15 to stay at the moved position or force for making the operating section 15 move in the horizontal direction has not been applied, the center of the operating section 15 is returned to the origin.

Further, the operating section 15 can be moved about in the vertical direction for the surface of the first cabinet 10A, by being pushed by such as a fingertip of a user. The displacement of the operating section 15 about in the horizontal and vertical directions for the surface of the first cabinet 10A makes the moving object on the display 11 move. That is, the displacement of the operating section 15 makes the cursor on the display 11 move or makes information on the display 11 scroll.

For example, in case that the cursor is used as the moving object, which moves together with the displacement of the operating section 15, the cursor is moved in the all directions on the screen of the display 11 by that the user moves the operating section 15 on the plane being almost parallel to the surface of the first cabinet 10A in the all directions by using such as the fingertip. With this, the user can select designated information displaying on the display 11.

And the user can decide information being selected by the cursor by pushing the operating section 15 on the plane being almost parallel to the surface of the first cabinet 10A about in the vertical direction by using such as his/her fingertip.

Figure 2:
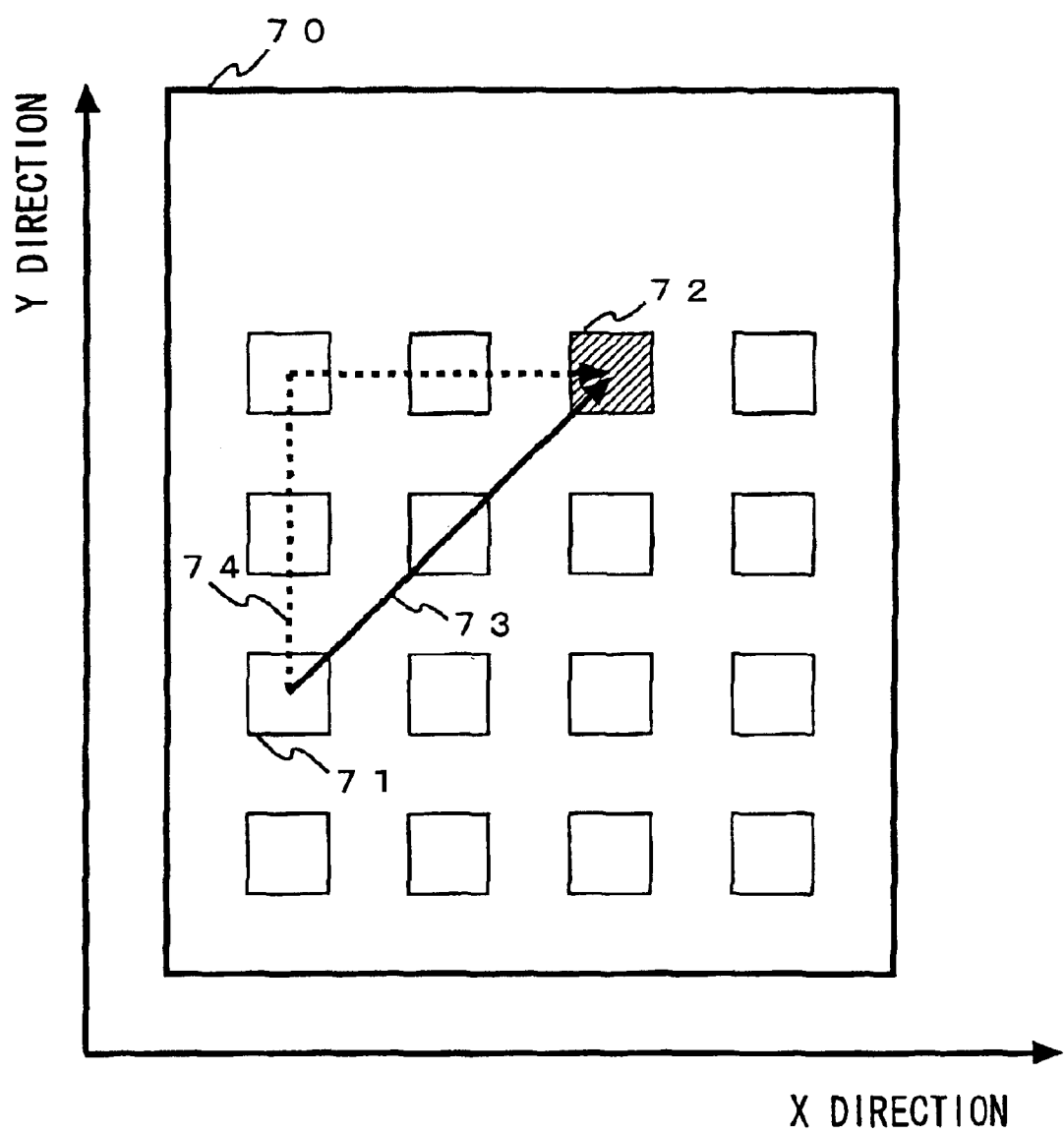
FIG. 2 is a diagram showing a screen on a display in the electronic instrument when a cursor is used as a moving object at the first embodiment of the electronic instrument of the present invention.

FIG. 2 is a diagram showing a screen on the display 11 when a cursor is used as the moving object at the first embodiment of the electronic instrument of the present invention. As shown in FIG. 2, 16 icons are shown in a 4×4 matrix state on a screen 70 on the display 11. Each of the icons symbolizes respective information and the information is selected and inputted (decided) by the cursor. In this, the cursor selects one of the 16 icons.

In this, a case, in which the cursor, selected an icon 71 firstly, is moved to an icon 72 (having oblique lines), is studied. At an inputting device, which can move the cursor only in the X or Y direction, in order to move the cursor from the icon 71 to the icon 72, as shown in a dotted line arrow 74, the icon must be moved by four scale units. That is, the cursor is moved by two scale units in the Y direction and tow scale units in the X direction. However, at the embodiments of the inputting device of the present invention, the cursor on the display 11 can be moved in the slanting direction for the X and Y directions, in addition to the X or Y direction. Therefore, when the cursor is moved from the icon 71 to the icon 72, as shown in a continuous line arrow 73, the cursor can be moved in the slanting direction by tow scale units. Consequently, at the embodiments of the present invention, the operation ability of the inputting device can be increased.

At the explanation mentioned above, the icons are arrayed in a 4×4 matrix state (16 icons). However, the number of icons and the positions of the icons are not limited to those mentioned above. And the number of icons, which is selected by the cursor at the same time, was one, however, the selecting number of icons is not limited to one.

Further, at the embodiments of the present invention, when the screen 70 on the display 11 is made to be a moving object, the screen 70 can be scrolled in the all directions. That is, the screen 70 can be scrolled in the slanting direction for the X and Y directions, in addition to the X or Y direction.

FIG. 3 is a diagram showing screen information displaying on a screen in the display 11 at the first embodiment of the electronic instrument of the present invention. In FIG. 3(a), total information is shown, and in FIG. 3(b), information, which can be displayed on the screen in the display 11, is shown.

Referring to FIG. 3, scrolling the screen on the display 11 at the first embodiment of the present invention is explained. In FIG. 3, screen information 80 shows designated map information being the total information, and a region surrounded by a dotted line frame 81 or a continuous line frame 82 is a region that can be displayed on the screen in the display 11. That is, a designated region in the screen information 80, within the region surrounded by the frame mentioned above, can be displayed on the screen, by scrolling the screen. In FIG. 3(b), a case, in which the region surrounded by the dotted line frame 81 is scrolled to the region surrounded by the continuous line frame 82, is shown.

At the first embodiment of the present invention, in case that the region surrounded by the dotted line frame 81 is displaying on the screen in the display 11, the region surrounded by the continuous line frame 82 is displayed on the screen in the display 11, by scrolling in the arrow direction 83 (slanting direction for the X and Y directions). As explained above, at the first embodiment of the present invention, the region can be scrolled in the slanting direction for the X and Y directions, in addition to the X and Y directions, as shown in FIG. 3. For example, when the screen information is map information, the screen information, which a user want to obtain, can be displayed on the screen in the display 11 easily and quickly, by making the screen move in the all direction on the X and Y plane. With this, the operation ability by the inputting device can be increased.

At the explanation mentioned above, the screen information 80 is the map information, however, the information is not limited to the map information, and any information can be used. Further, it is possible that the information on the screen in the display 11 is enlarged or reduced based on the displacement of the operating section 15.

And in many cases, some information via the Internet, such as a Web page, is delivered in a page unit. In case that the moving object is made to be information in a page unit, the screen information on the screen in the display 11 can be changed over in the page unit, by inputting a designated instruction.

Figure 4:
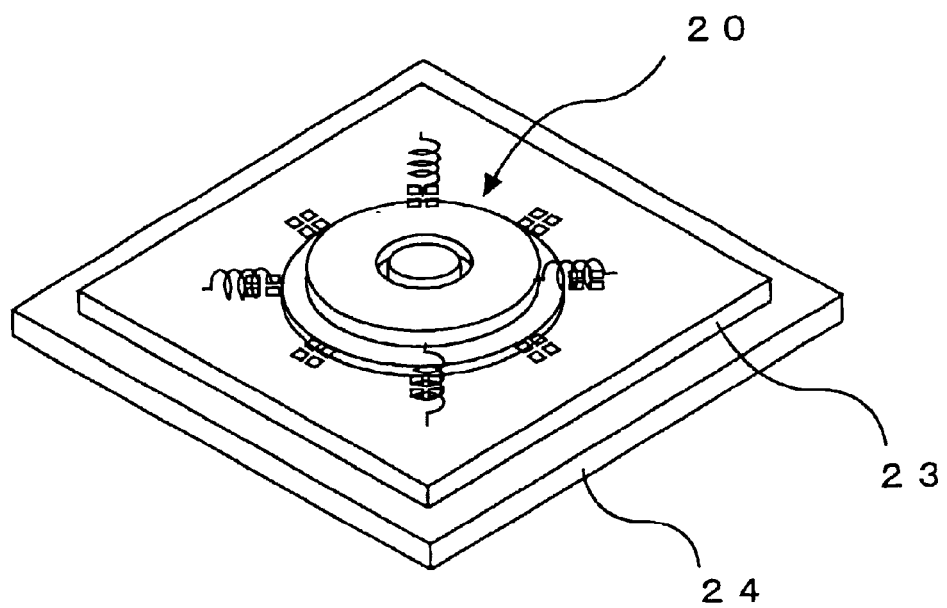
FIG. 4 is a perspective view showing an inputting device including a base plate with a printed circuit board (PCB) at the first embodiment of the electronic instrument of the present invention.

FIG. 4 is a perspective view showing the inputting device 20 including a base plate 23 with a printed circuit board (PCB) 24 at the first embodiment of the electronic instrument of the present invention. As shown in FIG. 4, the inputting device 20 including the base pate 23 is assembled with the PCB 24.

Figure 5:
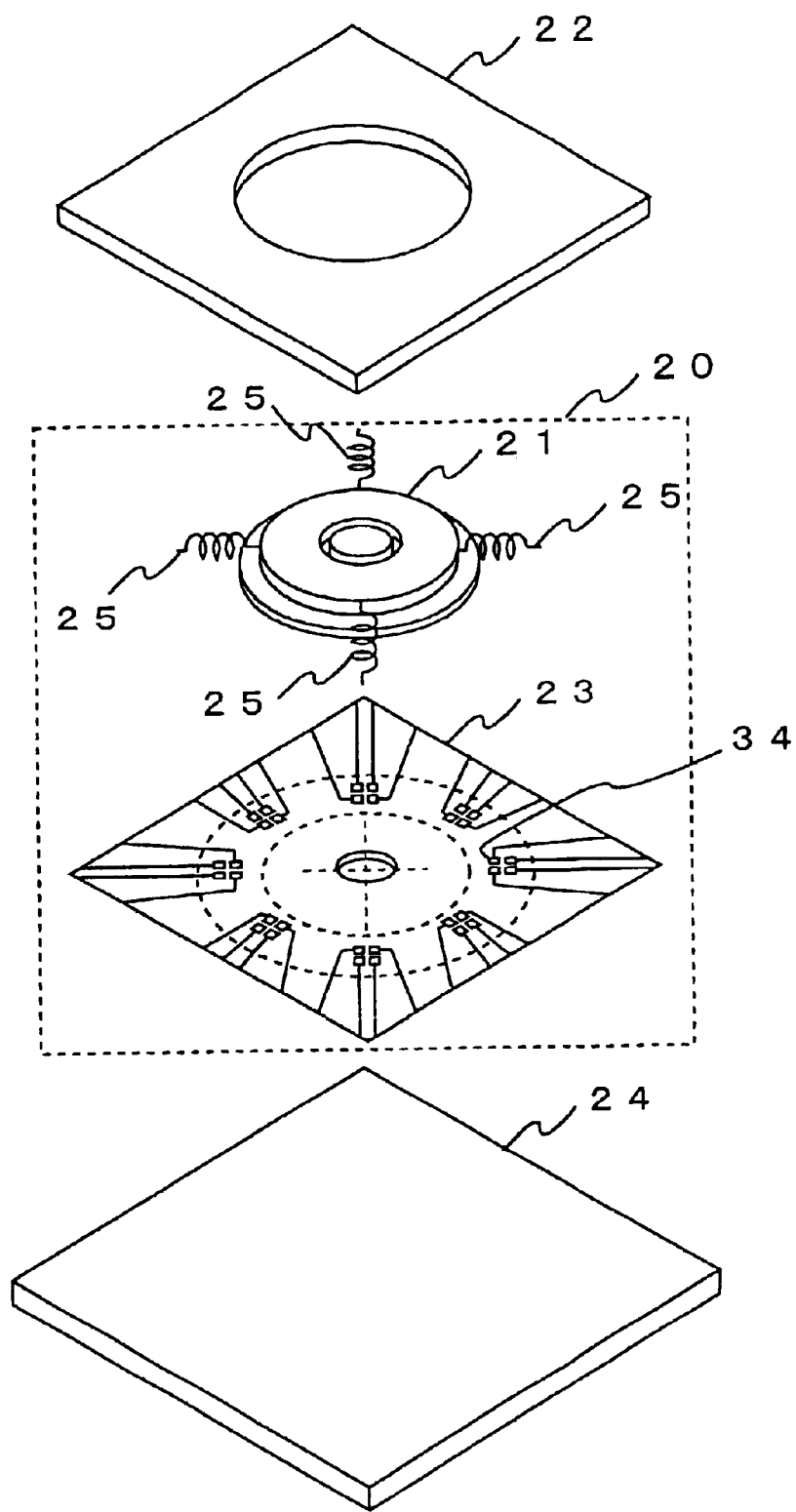
FIG. 5 is a perspective view showing the inputting device, in which the inputting device was disassembled and components in the inputting device are shown, with an upper part of a first cabinet and the PCB at the first embodiment of the electronic instrument of the present invention.

FIG. 5 is a perspective view showing the inputting device 20, in which the inputting device 20 was disassembled and components in the inputting device 20 are shown, with an upper part 22 of the first cabinet 10A and the PCB 24 at the first embodiment of the electronic instrument of the present invention.

Referring to FIGS. 1 and 5, the structure of each component in the inputting device 20, and the structure of the inputting device 20 assembled with the upper part 22 of the first cabinet 10A and the PCB 24 are explained.

As shown in FIG. 5, the inputting device 20 provides a moving section 21 being the operating section 15, the base plate 23, elastic components 25, and horizontal direction sensors 34. On the PCB 24, the base plate 23 having the horizontal direction sensors 34, the moving section 21 having the elastic components 25, and the upper part 22 of the first cabinet 10A are assembled in this order from the PCB 24.

At the center of the upper part 22 of the first cabinet 10A, an opening part is provided. The moving section 21 is disposed so that the moving section 21 penetrates the opening part of the upper part 22 of the first cabinet 10A. And the moving section 21 moves about in the horizontal direction on the base plate 23, within the operating region 16 decided by the opening part of the upper part 22 of the first cabinet 10A.

One end of each of the elastic components 25 is connected to the moving section 21, and the other end of each of the elastic components 25 is connected to the upper part 22 of the first cabinet 10A. And the elastic components 25 make the moving section 21 (operating section 15) return to the origin. In this, the number of the elastic components 25 and the positions of the elastic components 25 connecting to the moving section 21 can be decided arbitrarily, if the moving section 21 can return to the origin from an arbitrary position except the origin.

The horizontal direction sensors 34 are disposed on the base plate 23 in the detecting directions, and the number of the horizontal direction sensors 34 is decided arbitrarily corresponding to the detecting directions. The horizontal direction sensors 34 detect the displacement of the moving section 21 about in the horizontal direction. Further, plural horizontal direction sensors 34 can be disposed in each of the detecting directions, with this, the plural horizontal direction sensors 34 in the same direction can detect the difference of the moved distances of the moving section 21 from the origin. And this moved distance of the moving section 21 can be reflected to the moving velocity of the cursor. That is, when a second horizontal direction sensor has faster moving velocity than a first horizontal direction sensor on the same direction, the information on the display 11 can be scrolled faster at the second horizontal direction sensor.

A signal control circuit (not shown), such as a central processing unit (CPU) and a signal processor, is provided on the PCB 24. And the base plate 23 is connected to the PCB 24. A signal showing the displacement of the moving section 21 on the base plate 23 is outputted to the PCB 24 from the base plate 23, and the signal is processed at the signal control circuit on the PCB 24.

Figure 6:
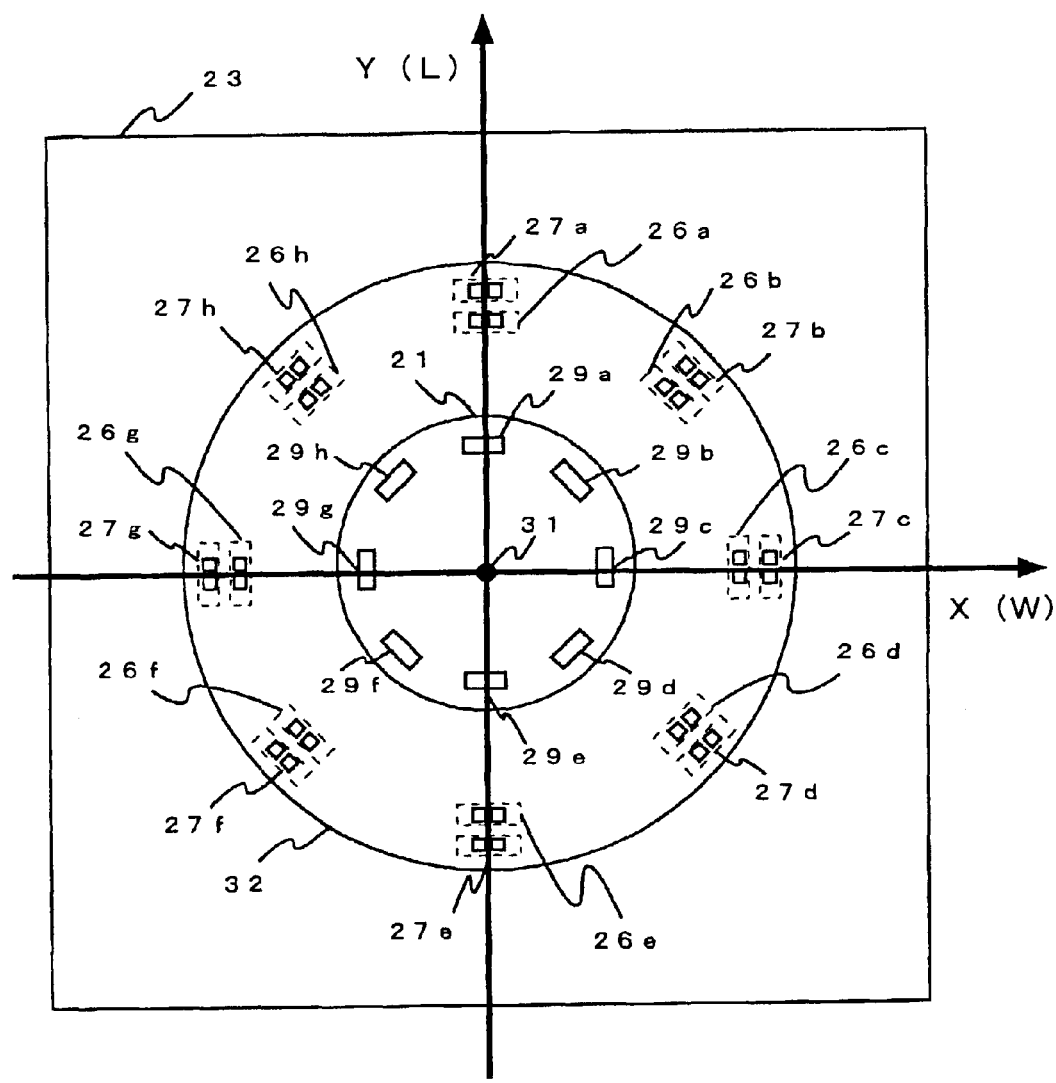
FIG. 6 is a plane view showing the inputting device at the first embodiment of the electronic instrument of the present invention.

FIG. 6 is a plane view showing the inputting device 20 at the first embodiment of the electronic instrument of the present invention. In FIG. 6, the inputting device 20 is shown from the upper side of the first cabinet 10A of the electronic instrument. As shown in FIG. 6, the center of the moving section 21 is positioned at the origin 31 in the operating region 32 on the base plate 23.

Referring to FIG. 6, operation detecting the displacement of the moving section 21 about in the horizontal direction is explained. The moving section 21 moves in the range within the operating region 32 (operating region 16 in FIG. 1) on the base plate 23. The displacement of the moving section 21 about in the horizontal direction is detected by the distance and the direction from the origin 31, decided in the operating region 32 on the base plate 23.

As shown in FIG. 6, the X axis is set so that the X axis passes through the origin 31 and goes in the direction being parallel to the base plate 23. And the Y axis is set so that the Y axis passes through the origin 31 and goes in the direction being parallel to the base plate 23 and being orthogonal to the X axis.

Conductors 29a, 29b, 29c, 29d, 29e, 29f, 29g, and 29h are disposed along the outer circle on the bottom surface, facing the base plate 23, of the moving section 21, in this order clockwise. The conductors 29a to 29h slide on the base plate 23. When some of the conductors 29a to 29h contact some of horizontal direction sensors 26a to 26h, and 27a to 27h (horizontal direction sensors 34 in FIG. 5) disposed on the base plate 23, the contacted horizontal direction sensors detect the displacement of the moving section 21 about in the horizontal direction.

When the center of the moving section 21 is positioned at the origin 31, the conductor 29a is positioned on the Y axis in its increasing direction as the origin 31 is the reference, and the conductor 29e is positioned on the Y axis in its decreasing direction as the origin 31 is the reference. The horizontal direction sensors 26a, 26e, 27a, and 27e are positioned on the Y axis.

When the center of the moving section 21 is positioned at the origin 31, the conductor 29c is positioned on the X axis in its increasing direction as the origin 31 is the reference, and the conductor 29g is positioned on the X axis in its decreasing direction as the origin 31 is the reference. The horizontal direction sensors 26c, 26g, 27c, and 27g are positioned on the X axis.

The horizontal direction sensors 27a to 27h are disposed along the outer circle on the surface showing the operating region 32 on the base plate 23. Further, the horizontal direction sensors 26a to 26h are disposed at the origin side of the horizontal direction sensors 27a to 27h.

Next, the position where each horizontal direction sensor was disposed and the detecting characteristics of each horizontal direction sensor are explained.

At the cross-points where the Y axis and the outer circle of the surface showing the operating region 32 cross, the horizontal direction sensor 27a is positioned near one end of the cross-points on the Y axis, being in its increasing direction, and the horizontal direction sensor 27e is positioned near the other end of the cross-points on the Y axis, being in its decreasing direction. And the horizontal direction sensor 26a is positioned at the origin side of the horizontal sensor 27a, and the horizontal direction sensor 26e is positioned at the origin side of the horizontal sensor 27e. The horizontal direction sensors 26a and 27a detect the displacement of the moving section 21 in the Y direction, by contacting the conductor 29a. And the horizontal direction sensors 26e and 27e detect the displacement of the moving section 21 in the Y direction, by contacting the conductor 29e.

At the cross-points where the X axis and the outer circle of the surface showing the operating region 32 cross, the horizontal direction sensor 27c is positioned near one end of the cross-points on the X axis, being in its increasing direction, and the horizontal direction sensor 27g is positioned near the other end of the cross-points on the X axis, being in its decreasing direction. And the horizontal direction sensor 26c is positioned at the origin side of the horizontal sensor 27c, and the horizontal direction sensor 26g is positioned at the origin side of the horizontal sensor 27g. The horizontal direction sensors 26c and 27c detect the displacement of the moving section 21 in the X direction, by contacting the conductor 29c. And the horizontal direction sensors 26g and 27g detect the displacement of the moving section 21 in the X direction, by contacting the conductor 29g.

The horizontal direction sensors 27a, 27b, 27c, 27d, 27e, 27f, 27g, and 27h are disposed along the outer circle on the operating region 32 of the base plate 23, in this order clockwise. The horizontal direction sensors 27b, 27d, 27f, and 27h are not positioned on the X and Y axes. That is, the horizontal direction sensors 27b, 27d, 27f, and 27h are positioned in the slanting directions for the X and Y axes as the origin 31 is the reference (in the directions not being parallel to the X and Y directions).

On the lines connecting the positions disposed the horizontal direction sensors 27b, 27d, 27f, and 27h, to the origin 31, the horizontal direction sensors 26b, 26d, 26f, and 26h are positioned at the side near the origin 31. That is, the horizontal direction sensors 26b, 26d, 26f, and 26h are also positioned in the slanting directions for the X and Y axes as the origin 31 is the reference (in the directions not being parallel to the X and Y directions).

When the center of the moving section 21 is positioned at the origin 31, the origin 31, the conductor 29b, the horizontal direction sensors 26b and 27b are positioned on the same line on the X-Y plane. As the same as above, the origin 31, the conductor 29d, the horizontal direction sensors 26d and 27d are positioned on the same line on the X-Y plane, and the origin 31, the conductor 29f, the horizontal direction sensors 26f and 27f are positioned on the same line on the X-Y plane. And the origin 31, the conductor 29h, the horizontal direction sensors 26h and 27h are positioned on the same line on the X-Y plane.

The displacement of the moving section 21 in the direction slanting for the X and Y directions is detected by that the horizontal direction sensors 26b and 27b contact the conductor 29b, the horizontal direction sensors 26d and 27d contact the conductor 29d, the horizontal direction sensors 26f and 27f contact the conductor 29f, or the horizontal direction sensors 26h and 27h contact the conductor 29h. In case that the Y direction is named as the length direction, and the X direction is named as the width direction, the horizontal direction sensors 26a and 27a and 26e and 27e detect the displacement of the moving section 21 in the length direction, and the horizontal direction sensors 26c and 27c and 26g and 27g detect the displacement of the moving section 21 in the width direction. And the horizontal direction sensors 26b, 27b, 26d, 27d, 26f, 27f, and 26h, 27h detect the displacement of the moving section 21 in the slanting directions for the length and width directions. Therefore, at the first embodiment of the present invention, the displacement of the moving section 21 can be detected not only in the length and width directions but also in the slanting directions.

Figure 7:
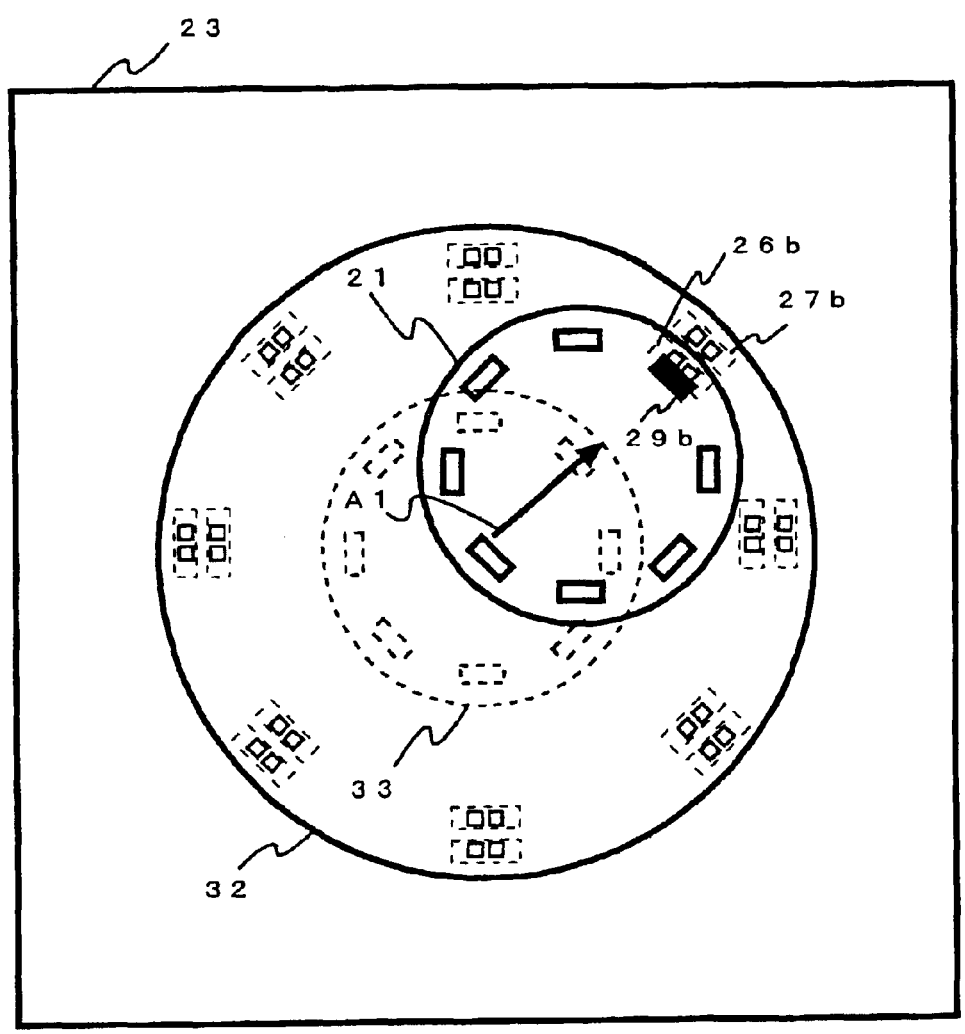
FIG. 7 is a plane view showing the inputting device in a case that a moving section was moved in a direction at the first embodiment of the electronic instrument of the present invention.

FIG. 7 is a plane view showing the inputting device 20 in a case that the moving section 21 was moved in a direction at the first embodiment of the electronic instrument of the present invention. As shown in FIG. 7, the moving section 21 was moved in the arrow A1 direction for the origin 31.

Referring to FIG. 7, operation detecting the displacement of the moving section 21 about in the horizontal direction is explained.

As mentioned above, the moving section 21 moves in the operating region 32 set on the base plate 23. The original position 33, shown in a dotted circle, is the original position of the moving section 21, and shows that the center of the moving section 21 is positioned at the origin 31 in the operating region 32.

As shown in FIG. 7, when the moving section 21 moved in the arrow A1 direction from the original position 33, the conductor 29b disposed in the moving section 21 contacts the horizontal direction sensor 26b. The horizontal direction sensor 26b detects the displacement of the moving section 21 about in the horizontal direction (slanting direction), by recognizing the contact with the conductor 29b.

Figure 8:
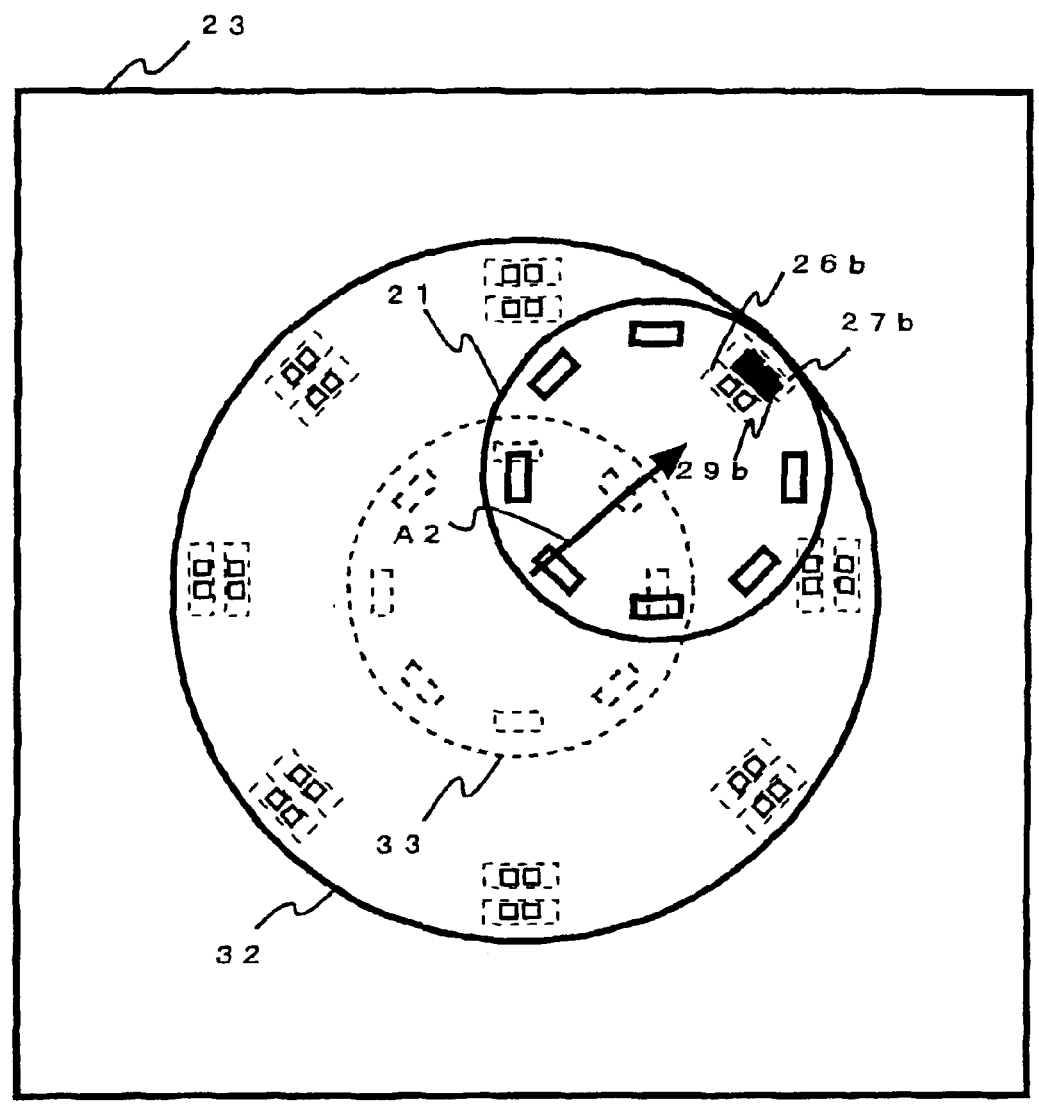
FIG. 8 is a plane view showing the inputting device in a case that the moving section was moved farther in the direction shown in FIG. 7 at the first embodiment of the electronic instrument of the present invention.

FIG. 8 is a plane view showing the inputting device 20 in a case that the moving section 21 was moved farther in the direction shown in FIG. 7 at the first embodiment of the electronic instrument of the present invention. As shown in FIG. 8, the moving section 21 was moved in the arrow A2 direction for the origin 31. In this, the directions of the arrows A1 and A2 are the same, but the moved distance of the moving section 21 from the origin 31 in the arrow A2 direction is longer than that in the arrow A1 direction.

Referring to FIG. 8, operation detecting the displacement of the moving section 21 about in the horizontal direction is explained.

As mentioned above, the moving section 21 moves in the operating region 32 set on the base plate 23. The original position 33, shown in the dotted circle, shows that the center of the moving section 21 is positioned at the origin 31 in the operating region 32.

As shown in FIG. 8, when the moving section 21 moved in the arrow A2 direction from the original position 33, the conductor 29b disposed in the moving section 21 contacts the horizontal direction sensor 27b, by passing through the horizontal direction sensor 26b. The horizontal direction sensor 27b detects the displacement of the moving section 21 about in the horizontal direction (slanting direction), by recognizing the contact with the conductor 29b.

As mentioned above, plural horizontal direction sensors, whose distances from the origin 31 are different from each other, are disposed in the same direction from the origin 31. With this, it becomes possible to detect the moved distance of the moving section 21, in addition to the moved direction of the moving section 21.

And moving control of moving objects (a cursor and scrolling screens) can be set corresponding to purposes based on the moved distance of the moving section 21 from the origin 31. For example, it can be set that the moving velocity of the cursor is changed corresponding to the moved distance of the moving section 21 from the origin 31. Or it can be set what moving object is used corresponding to the moved distance of the moving section 21 from the origin 31. That is, in case that moved distances are D1 and D2, and D1≠D2, when the moved distance is D1, the cursor is moved, and when the moved distance is D2, the screen is scrolled.

Figure 9:
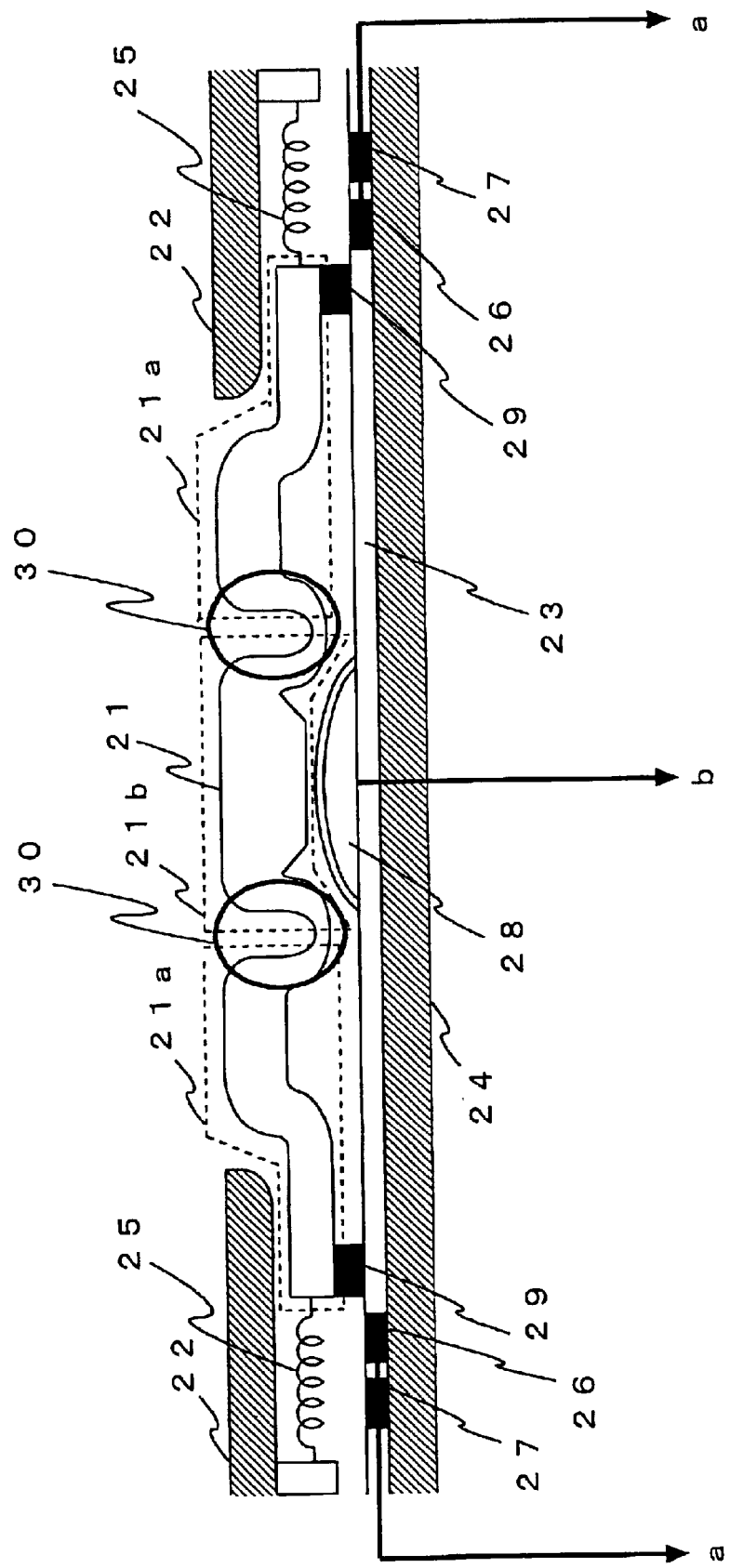
FIG. 9 is a sectional view showing the inputting device with the upper part of the first cabinet and the PCB at the first embodiment of the electronic instrument of the present invention.

FIG. 9 is a sectional view showing the inputting device 20 with the upper part 22 of the first cabinet 10A and the PCB 24 at the first embodiment of the electronic instrument of the present invention.

Referring to FIG. 9, the structure and the operation of the inputting device 20 is explained. As shown in FIG. 9, the inputting device 20 is disposed on the PCB 24 and the outer side of the inputting device 20 is covered with the upper part 22 of the first cabinet 10A. The inputting device 20 provides the moving section 21, the base plate 23, the elastic components 25, the horizontal direction sensors 26 and 27, a vertical direction sensor 28, and the conductors 29. In this, in FIGS. 6 to 8, the horizontal direction sensors 26 and 27 are shown with suffixes a to h, and also the conductors 29 are shown with suffixes a to h. And the moving section 21 provides a horizontal direction moving section 21a and a vertical direction moving section 21b.

The base plate 23 is disposed on the PCB 24. The horizontal direction sensors 26 and 27, and the vertical direction sensor 28 are disposed on the base plate 23. Each of the conductors 29 is disposed in each of the detecting directions (directions where the horizontal direction sensors 26 and 27 are disposed) on the horizontal direction moving section 21a. And each of the conductors 29 slides on the base plate 23 by the movement of the moving section 21.

Each of the elastic components 25 is also disposed in each of the detecting directions, as the same as each of the conductors 29. One end of each of the elastic components 25 is connected to the horizontal direction moving section 21a, and the other end of each of the elastic components 25 is fixed to the upper part 22 of the first cabinet 10A. In this, the elastic force of the elastic components 25 works in the direction being parallel to the base plate 23.

When a user applies force to the moving section 21 by using such as his/her fingertip about in the horizontal direction, the horizontal direction moving section 21a moves about in the horizontal direction against the elastic force of the elastic components 25. The conductors 29 on the horizontal direction moving section 21a slide on the base plate 23, by the movement of the horizontal direction moving section 21a. As a result, one of the conductors 29 contacts one of the horizontal direction sensors 26 or 27. One of the horizontal direction sensors 26 or 27, which contacted one of the conductors 29, detects the displacement of the moving section 21 about in the horizontal direction, and outputs a horizontal direction detection signal 'a', which shows the displacement of the moving section 21 about in the horizontal direction.

The elastic components 25 makes the moving section 21, which was displaced about in the horizontal direction against the elastic force of the elastic components 25, return to the original position 33. That is, when a user displaced the moving section 21 about in the horizontal direction by using his/her fingertip, the elastic components 25, were deflected. And when the user releases his/her fingertip from the moving section 21 after the user displaced the moving section 21, the moving section 21 is returned to the original position 33 by the restoring force of the deflected elastic components 25. In this, as the elastic components 25, compression springs, other components having elasticity, or any mechanism, which can make the moving section 21 return to the original position 33 after the moving section 21 was displaced, can be used.

Further, when the user applies force to the moving section 21 (the vertical direction moving section 21b) by using such as his/her fingertip about in the vertical direction, that is, the user pushes the vertical direction moving section 21b, a deflecting part 30 of the moving section 21 is deflected, and the vertical direction moving section 21b moves down about in the vertical direction.

When the vertical direction moving section 21b was moved down vertically, the vertical direction moving section 21b contacts the vertical direction sensor 28. The vertical direction sensor 28 detects the displacement of the moving section 21 about in the vertical direction, by contacting the vertical direction moving section 21b. The vertical direction sensor 28 outputs a vertical direction detection signal 'b' showing the displacement of the moving section 21 about in the vertical direction, based on the detected displacement of the vertical direction moving section 21b. In this, as the vertical direction sensor 28, a metal dome can be used, however, the vertical direction sensor 28 is not limited to the metal dome, and other component can be used as the vertical direction sensor 28.

Figure 10:
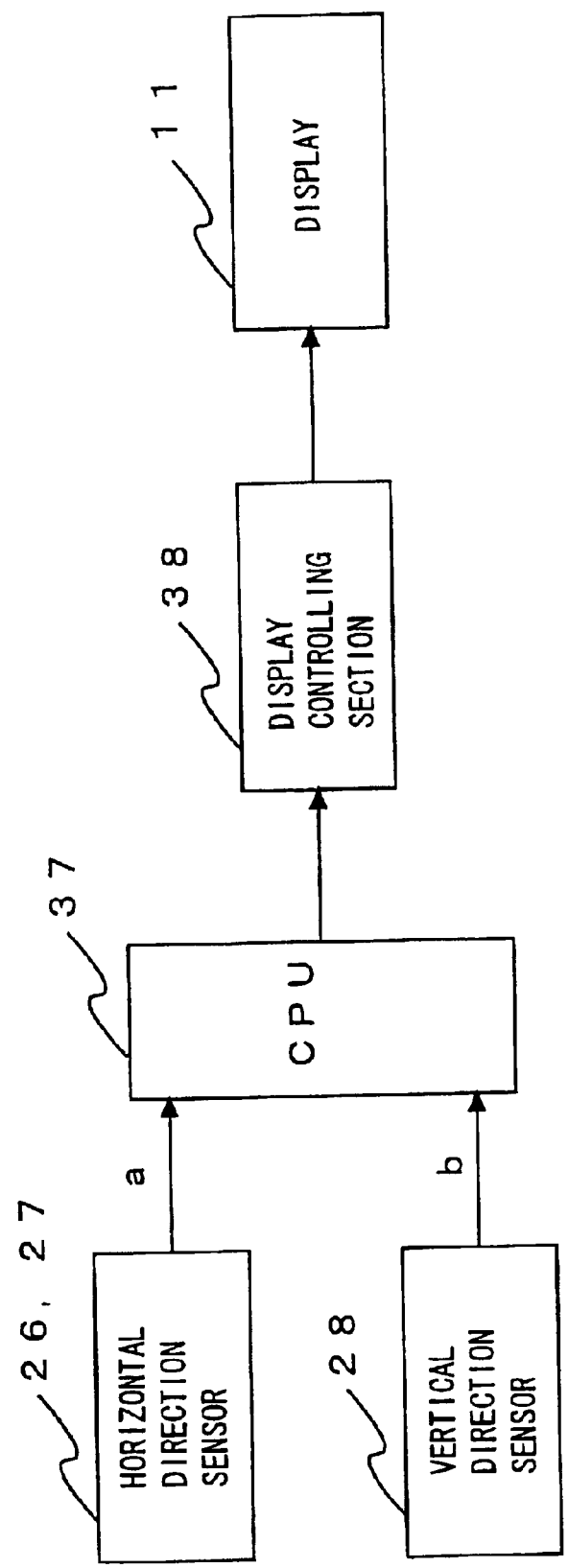
FIG. 10 is a block diagram showing control at the inputting device for the display at the first embodiment of the electronic instrument of the present invention.

FIG. 10 is a block diagram showing the control at the inputting device 20 for the display 11 at the first embodiment of the electronic instrument of the present invention. Referring to FIGS. 1, 9, and 10, the control of the display 11 by the inputting device 20 by detecting the displacement of the moving section 21 is explained.

As shown in FIG. 10, the inputting device 20 provides the horizontal direction sensors 26 and 27, the vertical direction sensor 28, and the PCB 24 provides a CPU 37, and a display controlling section 38, and the display controlling section 38 controls the display 11.

The horizontal direction sensors 26 and 27 detect the displacement of the moving section 21 about in the horizontal direction, and output the horizontal direction detection signal 'a' to the CPU 37 based on the detected result. The vertical direction sensor 28 detects the displacement of the moving section 21 about in the vertical direction, and outputs the vertical direction detection signal 'b' to the CPU 37 based on the detected result.

The CPU 37 instructs the display controlling section 38 to move the moving object on the display 11, by receiving the horizontal direction detection signal 'a', which shows the displacement of the moving section 21 about in the horizontal direction. The CPU 37 instructs the display controlling section 38 to decide information being selected by the moving object on the display 11, by receiving the vertical direction detection signal 'b', which shows the displacement of the moving section 21 about in the vertical direction.

At the first embodiment of the present invention, the horizontal direction detection signal 'a' was used to control the movement (moving distance and moving direction) of the moving object on the display 11, and the vertical direction detection signal 'b' was used to control the decision of the information being selected by the moving object on the display 11. However, the control is not limited to the control mentioned above. For example, the decision of the information can be controlled by the horizontal direction detection signal 'a', and the movement of the moving object can be controlled by the vertical direction detection signal 'b'.

The display controlling section 38, based on the instruction from the CPU 37, makes the display 11 display information, and controls the movement of the moving object on the display 11, and also controls the decision of the information being displayed on the display 11. The display 11 displays various kinds of information based on the control of the display controlling section 38.

And the different moving velocity, by which the moving object on the display 11 is moved, can be set at the horizontal direction sensor 26 and the horizontal direction sensor 27. With this, the display controlling section 38 can control the moving velocity of the moving object on the display 11, corresponding to the different moving velocity of the horizontal direction sensor 26 and the horizontal direction sensor 27 which detected the displacement of the moving section 21. The horizontal direction sensors 26 and 27 output the horizontal direction detection signal 'a' to the CPU 37 by detecting the displacement of the moving section 21 about in the horizontal direction. The CPU 37 judges the moving velocity setting in the horizontal direction sensors 26 and 27 that detected the displacement of the moving section 21, based on the inputted horizontal direction detection signal 'a'. And the CPU 37 instructs the display controlling section 38 to make the moving object move at the judged moving velocity.

The display controlling section 38, based on the instruction outputted from the CPU, makes the moving object on the display 11 move at the moving velocity judged by the CPU 37 in a designated direction.

Figure 11:
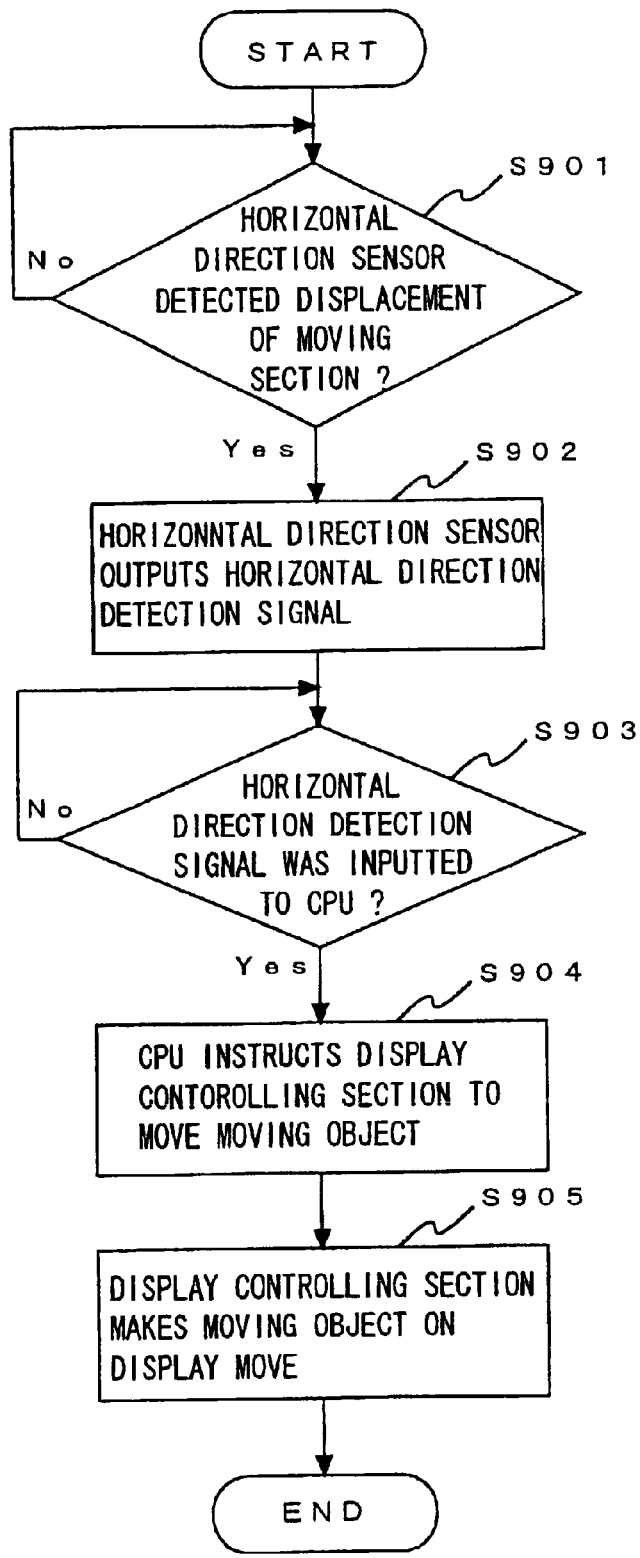
FIG. 11 is a flowchart showing operation of the inputting device in case that the moving section moves about in the horizontal direction at the first embodiment of the electronic instrument of the present invention.

FIG. 11 is a flowchart showing operation of the inputting device 20 in case that the moving section 21 moves about in the horizontal direction at the first embodiment of the electronic instrument of the present invention. Referring to FIGS. 10 and 11, the operation of the inputting device 20 in case that the moving section 21 moves about in the horizontal direction at the first embodiment of the electronic instrument of the present invention is explained.

First, it is judged whether the horizontal direction sensor 26 or 27 detected the displacement of the moving section 21 about in the horizontal direction or not (step S901). When it was judged that the displacement of the moving section 21 about in the horizontal direction was not detected (No at the step S901), the process at the step S901 is repeated.

When it was judged that the displacement of the moving section 21 about in the horizontal direction was detected (Yes at the step S901), the horizontal direction sensor 26 or 27 outputs the horizontal direction detection signal 'a', which shows the displacement of the moving section 21 about in the horizontal direction, to the CPU 37 (step S902).

The CPU 37 judges whether the horizontal direction detection signal 'a' outputted from the horizontal direction sensors 26 or 27 was inputted to the CPU 37 or not (step S903). When it was judged that the horizontal direction detection signal 'a' was not inputted to the CPU 37 (No at the step S903), the process at the step S903 is repeated.

When it was judged that the horizontal direction detection signal 'a' was inputted to the CPU 37 (Yes at the step S903), the CPU 37 outputs an instruction, which makes the moving object on the display 11 move, to the display controlling section 38, based on the inputted horizontal direction detection signal 'a' (step S904).

The display controlling section 38, based on the instruction from the CPU 37, makes the moving object on the display 11 move (step S905). With these processes mentioned above, the inputting device 20 ends the operation, which controls the display 11 by the displacement of the moving section 21 about in the horizontal direction.

Figure 12:
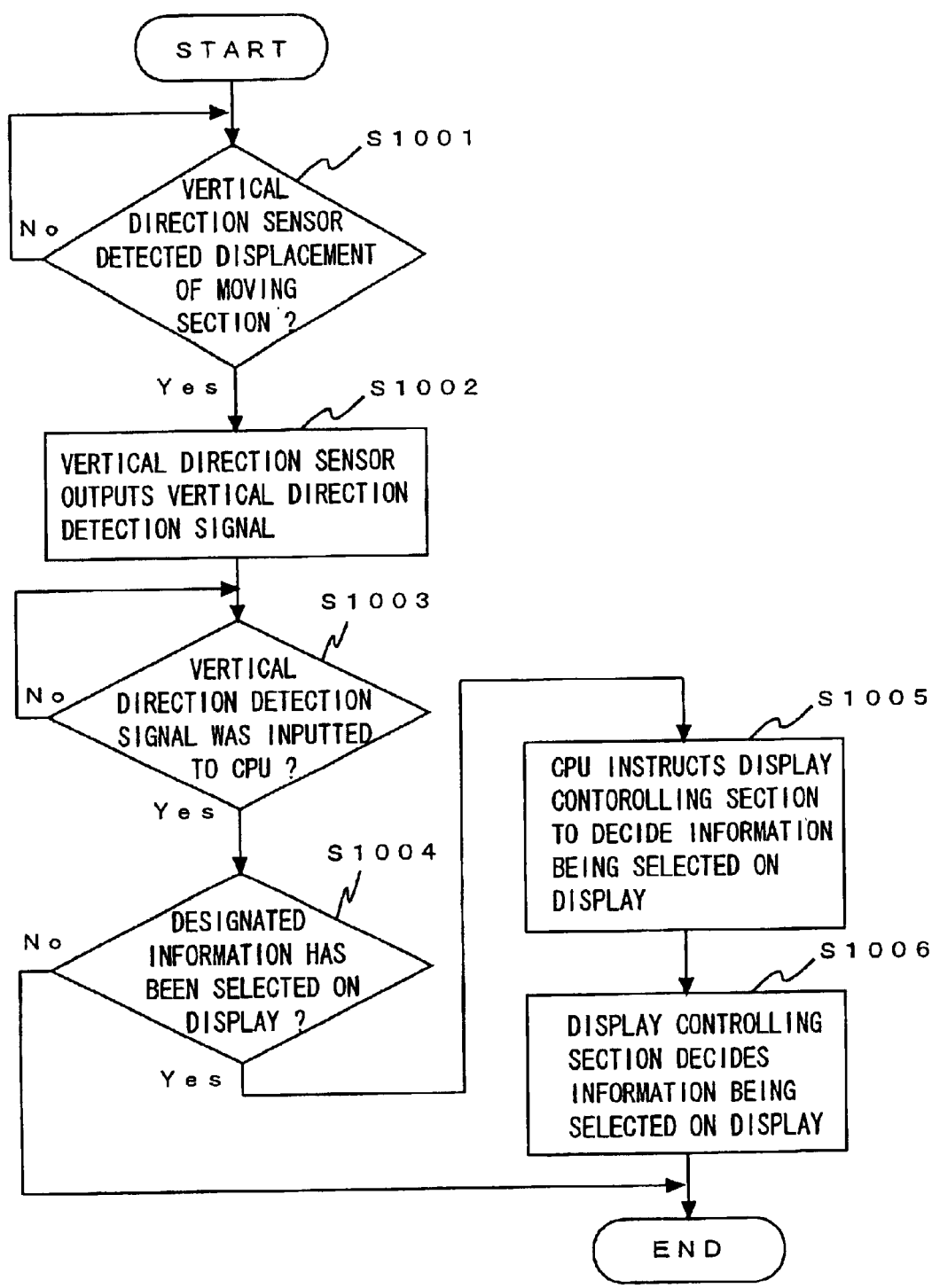
FIG. 12 is a flowchart showing operation of the inputting device in case that the moving section moves about in the vertical direction at the first embodiment of the electronic instrument of the present invention.

FIG. 12 is a flowchart showing operation of the inputting device 20 in case that the moving section 21 moves about in the vertical direction at the first embodiment of the electronic instrument of the present invention. Referring to FIGS. 10 and 12, the operation of the inputting device 20 in case that the moving section 21 moves about in the vertical direction at the first embodiment of the electronic instrument of the present invention is explained.

First, it is judged whether the vertical direction sensor 28 detected the displacement of the moving section 21 about in the vertical direction or not (step S1001). When it was judged that the displacement of the moving section 21 about in the vertical direction was not detected (No at the step S1001), the process at the step S1001 is repeated.

When it was judged that the displacement of the moving section 21 about in the vertical direction was detected (Yes at the step S1001), the vertical direction sensor 28 outputs the vertical direction detection signal 'b', which shows the displacement of the moving section 21 about in the vertical direction, to the CPU 37 (step S1002).

The CPU 37 judges whether the vertical direction detection signal 'b' outputted from the vertical direction sensor 28 was inputted to the CPU 37 or not (step S1003). When it was judged that the vertical direction detection signal 'b' was not inputted to the CPU 37 (No at the step S1003), the process at the step S1003 is repeated.

When it was judged that the vertical direction detection signal 'b' was inputted to the CPU 37 (Yes at the step S1003), the CPU judges whether designated information has been selected on the display 11 by the moving object or not (step S1004). In case that designated information has not been selected on the display 11 (No at the step S1004), the inputting device 20 ends the operation, which controls the display 11 by the displacement of the moving section 21 about in the vertical direction.

In case that it was judged that the designated information had been selected on the display 11 by the moving object (Yes at the step S1004), the CPU 37, based on the inputted vertical direction detection signal 'b', instructs the display controlling section 38 to decide information being selected on the display 11 (step S1005).

The display controlling section 38, based on the instruction from the CPU, decides the information being selected on the display 11 (step S1006). With these processes mentioned above, the inputting device 20 ends the operation, which controls the display 11 by the displacement of the moving section 21 about in the vertical direction.

As mentioned above, according to the first embodiment of the present invention, the movement of the moving object on the display 11 in the slanting direction can be controlled easily and precisely, by detecting not only the displacement of the moving section 21 (the operating section 15) in the X and Y directions (length and width directions) but also detecting the movement of the moving section 21 in the slanting direction for the X and Y directions.

And at the first embodiment of the present invention, the movement of the moving object on the display 11 is controlled by the displacement of the moving section 21 about in the horizontal direction. And the input (decision) of information, which has been selected by the moving object on the display 11, is controlled by the displacement of the moving section 21 about in the vertical direction being completely different from about in the horizontal direction. Therefore, it can be prevented that an error input (decision) is executed on the display 11 by error operation at the operating section 15 (moving section 21).

At the first embodiment of the present invention, as mentioned above, the eight horizontal direction sensors 26 and the eight horizontal direction sensors 27 and the eight conductors 29 are disposed as the origin 31 is made to be the reference. However, the positions and the number of them are not limited to those at the explanation mentioned above.

Figure 13:
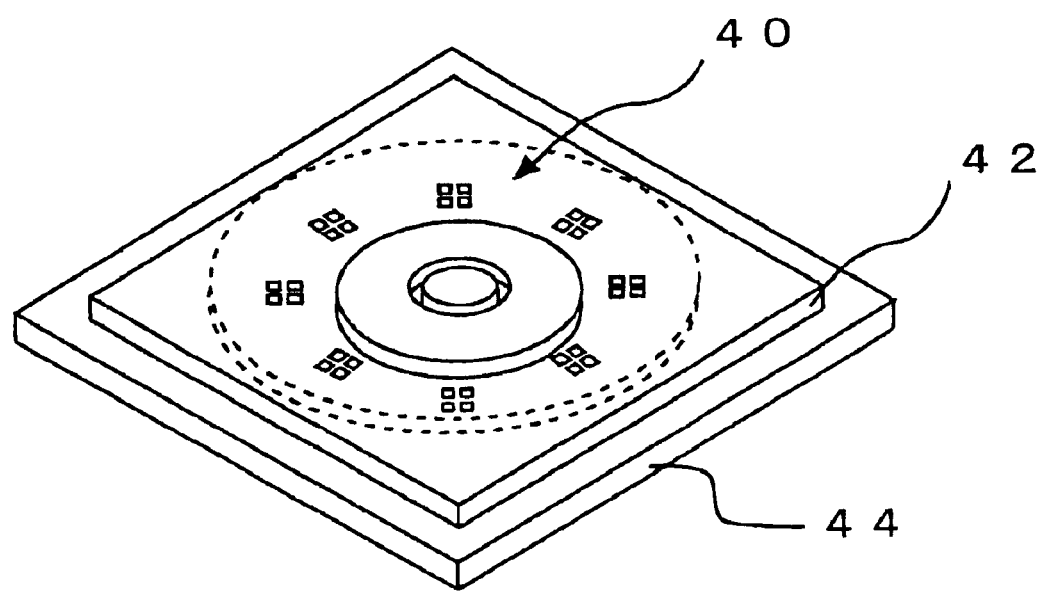
FIG. 13 is a perspective view showing an inputting device with an upper part of a first cabinet and a PCB at a second embodiment of the electronic instrument of the present invention.

Next, referring to drawings, an inputting device at a second embodiment of the electronic instrument of the present invention is explained. In this, each function at the second embodiment has the same reference number as that at the first embodiment, if the function has almost the same function at the first embodiment. FIG. 13 is a perspective view showing an inputting device 40 with an upper part 42 of the first cabinet 10A and a PCB 44 at the second embodiment of the electronic instrument of the present invention. As shown in FIG. 13, the inputting device 40 is assembled with the upper part 42 of the first cabinet 10A and the PCB 44.

Figure 14:
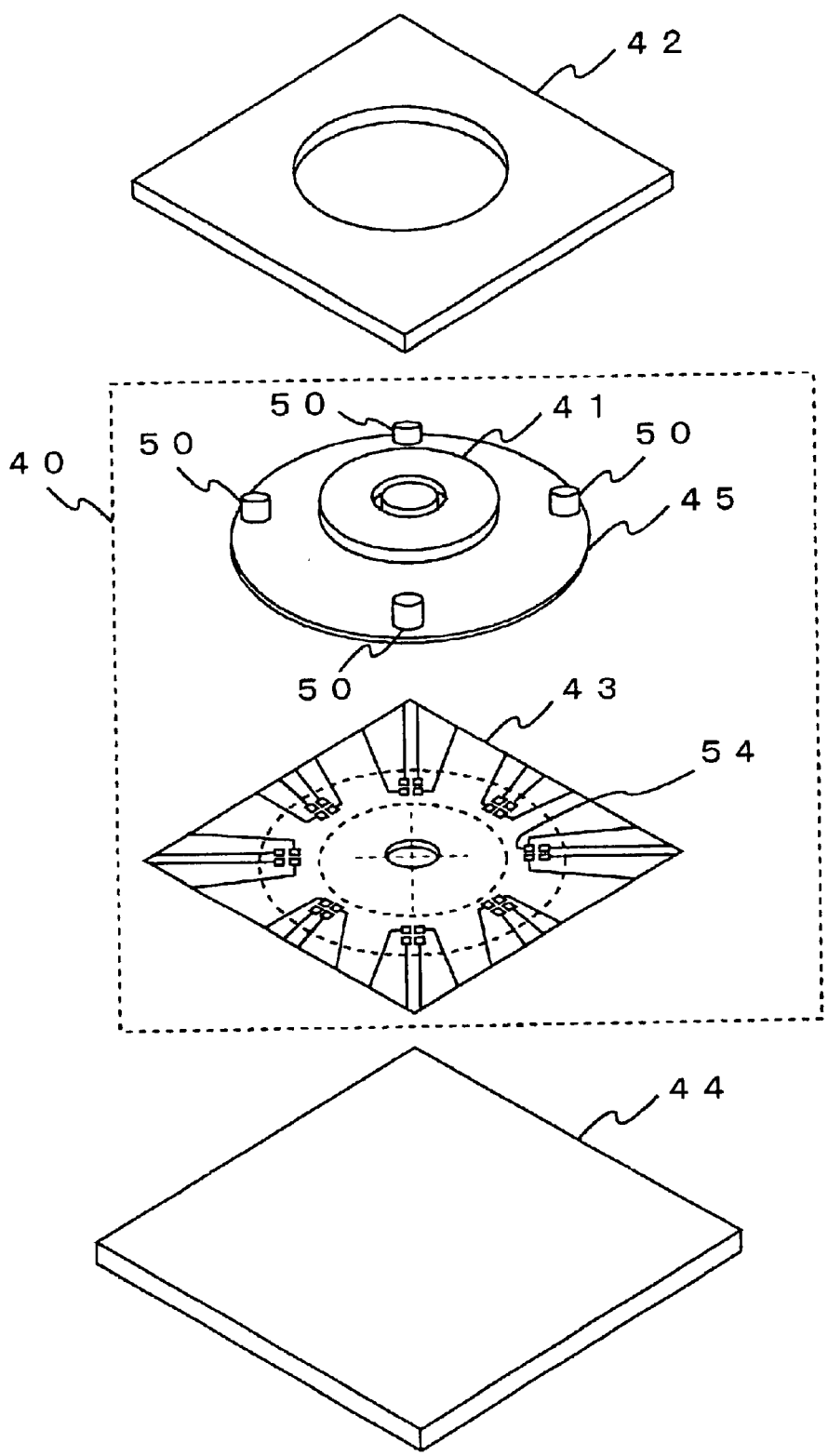
FIG. 14 is a perspective view showing the inputting device, in which the inputting device was disassembled and components in the inputting device are shown, with the upper part of the first cabinet and the PCB at the second embodiment of the electronic instrument of the present invention.

FIG. 14 is a perspective view showing the inputting device 40, in which the inputting device 40 was disassembled and components in the inputting device 40 are shown, with the upper part 42 of the first cabinet 10A and the PCB 44 at the second embodiment of the electronic instrument of the present invention.

Referring to FIG. 14, the structure of each component in the inputting device 40, and the structure of the inputting device 40 assembled with the upper part 42 of the first cabinet 10A and the PCB 44 are explained.

As shown in FIG. 14, the inputting device 40 provides a moving section 41 being the operating section 15, a base plate 43, an elastic component 45, and horizontal direction sensors 54. On the PCB 44, the base plate 43 having the horizontal direction sensors 54, the moving section 41 having the elastic component 45, and the upper part 42 of the first cabinet 10A are assembled in this order from the PCB 44.

At the center of the upper part 42 of the first cabinet 10A, an opening part is provided. The moving section 41 is disposed so that the moving section 41 penetrates the opening part of the upper part 42 of the first cabinet 10A. And the moving section 41 moves about in the horizontal direction on the base plate 43, within the operating region 16 decided by the opening part of the upper part 42 of the first cabinet 10A.

The elastic component 45 has a plate shape, and for example, can be a rubber plate. The bottom surface, facing the base plate 43, of the moving section 41 is adhered to the elastic component 45. Each one end of plural supporting components 50 is adhered on the region, where the moving section 41 is not adhered, of the elastic component 45. The other end of each of the plural supporting components 50 is fixed on the upper part 42 of the first cabinet 10A. In this, the number and the positions of the supporting components 50 for the moving section 41 are arbitrary, under the condition that the center of the moving section 41 can be returned to the origin 31 from arbitrary positions except the origin 31.

When the center of the moving section 41 moves to a position except the origin 31 on the base plate 43, the elastic component 45 is stretched and contracted. After this, when force moved the moving section 41 has not been applied, the center of the moving section 41 returns to the origin 31 by the elastic force of the elastic component 45.

The horizontal direction sensors 54 are disposed on the base plate 43 in the detecting directions, and the number of the horizontal direction sensors 54 is decided arbitrarily corresponding to the detecting directions. The horizontal direction sensors 54 detect the displacement of the moving section 41 about in the horizontal direction. Further, plural horizontal direction sensors 54 can be disposed in each of the detecting directions, and detect the moved distance of the moving section 41 from the origin 31. And this moved distance of the moving section 41 can be reflected to the moving velocity of the cursor.

Figure 15:
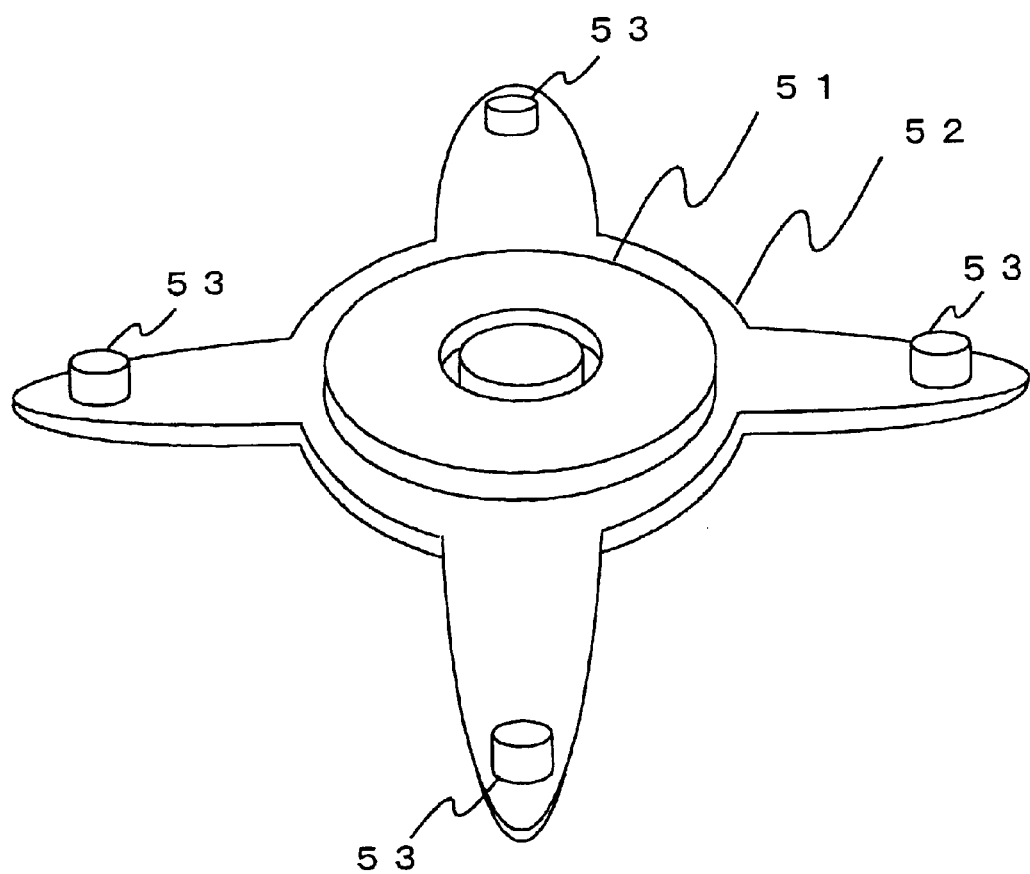
FIG. 15 is a perspective view showing a moving section and an elastic component having supporting components in an inputting device at a modified example of the second embodiment of the electronic instrument of the present invention.

FIG. 15 is a perspective view showing a moving section and an elastic component having supporting components in an inputting device at a modified example of the second embodiment of the electronic instrument of the present invention. In FIG. 15, the function of a moving section 51 is the same as that of the moving section 41 shown in FIG. 14, the function of an elastic component 52 is the same as that of the elastic component 45 shown in FIG. 14, and the function of supporting components 53 is the same as that of the supporting components 50 shown in FIG. 14.

As shown in FIG. 15, the elastic component 52 has a shape in which its center part is a disk and the disk has four projections. The moving section 51 is adhered on the disk part of the elastic component 52. And each one end of the supporting components 53 is adhered on each of the projections of the elastic component 52. Each of the other ends of the supporting components 53 is fixed to the upper part 42 of the first cabinet 10A.

Figure 16:
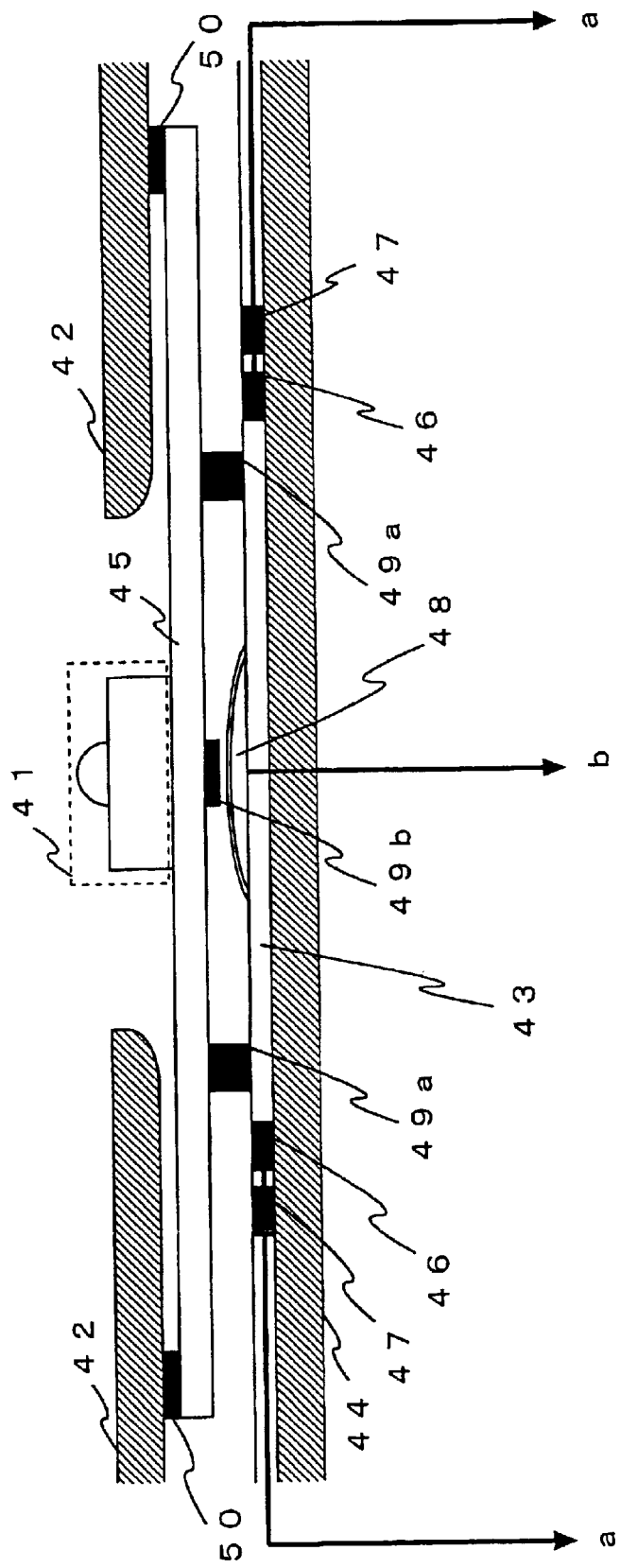
FIG. 16 is a sectional view showing the inputting device with the upper part of the first cabinet and the PCB at the second embodiment of the electronic instrument of the present invention.

FIG. 16 is a sectional view showing the inputting device 40 with the upper part 42 of the first cabinet 10A and the PCB 44 at the second embodiment of the electronic instrument of the present invention. Referring to FIG. 16, the structure and the operation of the inputting device 40 is explained.

As shown in FIG. 16, the inputting device 40 is disposed on the PCB 44 and the outer side of the inputting device 40 is covered with the upper part 42 of the first cabinet 10A. The inputting device 40 provides the moving section 41, the base plate 43, the elastic component 45, horizontal direction sensors 46 (54 in FIG. 14), horizontal direction sensors 47 (54 in FIG. 14), a vertical direction sensor 48, conductors 49a, and a conductor 49b.

The base plate 43 is disposed on the PCB 44. The horizontal direction sensors 46 and 47, and the vertical direction sensor 48 are disposed on the base plate 43.

The moving section 41 is adhered on the surface, facing the upper part 42 of the first cabinet 10A, of the elastic component 45. And each one end of the supporting components 50 is adhered on the surface, facing the upper part 42 of the first cabinet 10A, of the elastic component 45. Each of the other ends of the supporting components 50 is fixed on the upper part 42 of the first cabinet 10A by adhering. On the surface, facing the PCB 44, of the elastic component 45, the eight conductors 49a and the conductor 49b are adhered. Each of the conductors 49a is disposed in the direction detecting the horizontal direction displacement of the moving section 41 on the elastic component 45, and slides on the base plate 43.

When a user applies force to the moving section 41 by using such as his/her fingertip about in the horizontal direction, the moving section 41 moves about in the horizontal direction from the origin 31 against the elastic force by the stretch and contract of the elastic component 45. The conductors 49a slide on the base plate 43, by the displacement of the moving section 41 about in the horizontal direction. As a result, one of the conductors 49a contacts one of the horizontal direction sensors 46 or 47. One of the horizontal direction sensors 46 or 47, which contacted one of the conductors 49a, detects the displacement of the moving section 41 about in the horizontal direction, and outputs a horizontal direction detection signal 'a', which shows the displacement of the moving section 41 about in the horizontal direction.

The elastic component 45 makes the moving section 41, which was displaced about in the horizontal direction against the elastic force of the elastic component 45, return to the original position 33. That is, when a user displaced the moving section 41 about in the horizontal direction by using his/her fingertip, the elastic component 45 was deflected. And when the user releases his/her fingertip from the moving section 41 after the user displaced the moving section 41, the moving section 41 is returned to the original position 33 by the restoring force of the deflected elastic component 45.

Further, when the user applies force to the moving section 41 by using such as his/her fingertip about in the vertical direction, that is, the user pushes the moving section 41, the elastic component 45 is deflected, and the conductor 49b moves down in the vertical direction.

When the conductor 49b is moved down vertically, the conductor 49b contacts the vertical direction sensor 48. The vertical direction sensor 48 detects the displacement of the moving section 41 about in the vertical direction, by contacting the conductor 49b. The vertical direction sensor 48 outputs a vertical direction detection signal 'b' showing the displacement of the moving section 41 about in the vertical direction, based on the detected displacement of the moving section 41. In this, as the vertical direction sensor 48, a metal dome can be used, however, the vertical direction sensor 48 is not limited to the metal dome, and other component can be used as the vertical direction sensor 48.

And at the second embodiment of the present invention, the movement of the moving object on the display 11 is controlled by the displacement of the operating section 15 (moving section 41) about in the horizontal direction. And the input (decision) of information, which has been selected by the moving object on the display 11, is controlled by the displacement of the operating section 15 about in the vertical direction being completely different from about in the horizontal direction. Therefore, it can be prevented that an error input (decision) is executed on the display 11 by error operation at the operating section 15.

At the second embodiment of the present invention, the eight horizontal direction sensors 54 (shown in FIG. 14) and the eight conductors 49*a* are disposed as the origin 31 is made to be the reference. However, the positions and the number of them are not limited to those at the explanation mentioned above.

Figure 17:
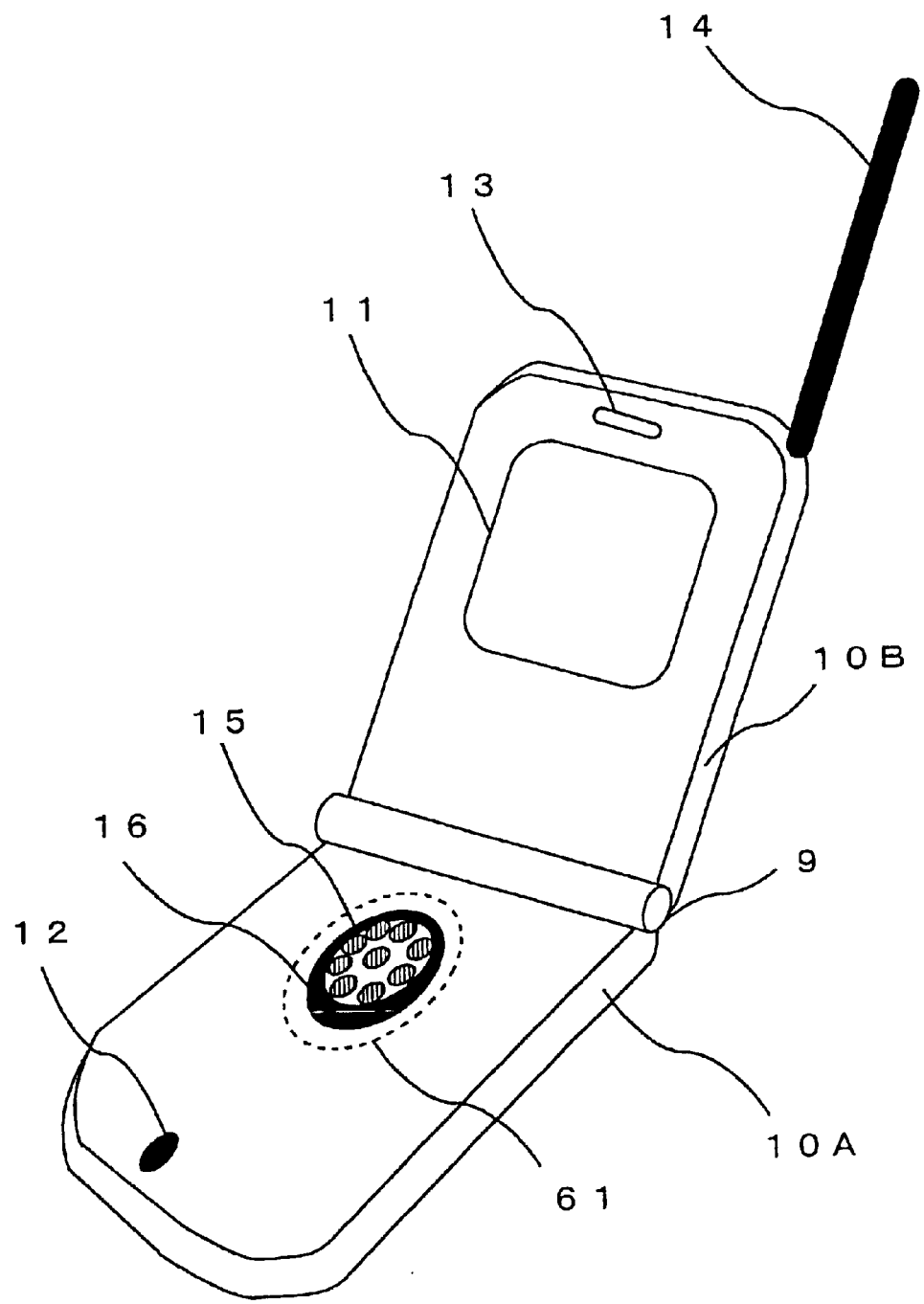
FIG. 17 is a perspective view showing an electronic instrument using an inputting device at a third embodiment of the present invention.

Next, referring to the drawings, a third embodiment of the present invention is explained. FIG. 17 is a perspective view showing an electronic instrument using an inputting device at the third embodiment of the present invention. In FIG. 17, a mobile communication terminal is shown as the electronic instrument. Each function at the third embodiment of the present invention has the same reference number as that at the first and second embodiments, if the function is almost the same as that at the first and second embodiments.

Figure 18:
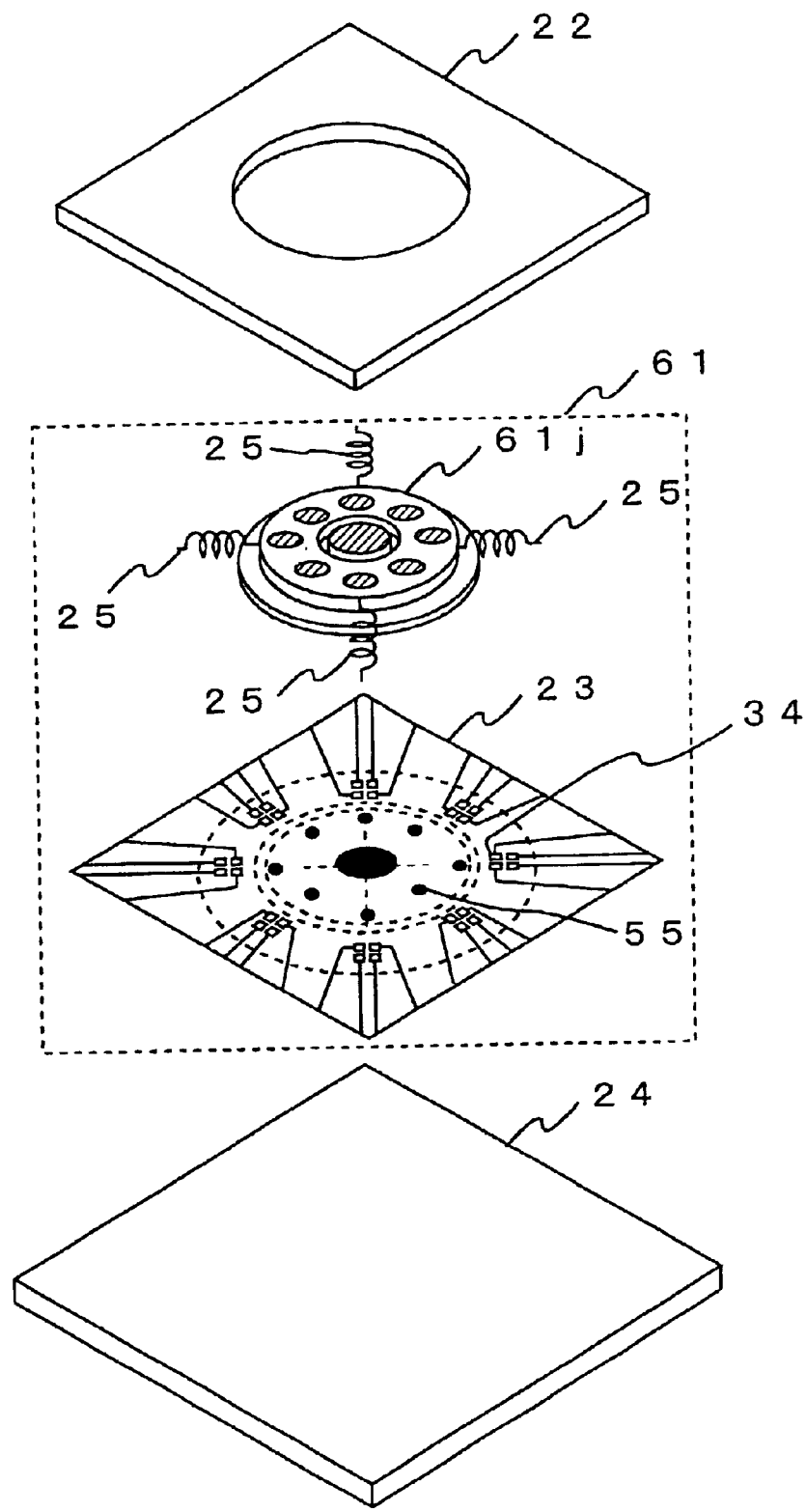
FIG. 18 is a perspective view showing an inputting device, in which the inputting device was disassembled and components in the inputting device are shown, with an upper part of a first cabinet and a PCB at the third embodiment of the electronic instrument of the present invention.

At the inputting device of the third embodiment of the electronic instrument of the present invention, the inputting device provides input designating sections, in addition to a moving section. FIG. 18 is a perspective view showing an inputting device 61, in which the inputting device 61 was disassembled and components in the inputting device 61 are shown, with an upper part 22 of the first cabinet 10A and a PCB 24 at the third embodiment of the electronic instrument of the present invention.

Referring to FIGS. 17 and 18, the structure and the operation of the inputting device 61 at the third embodiment of the electronic instrument of the present invention are explained. As shown in FIG. 18, the inputting device 61 provides a moving section 61*j* being the operating section 15, a base plate 23, elastic components 25, horizontal direction sensors 34, and vertical direction sensors 55. On the PCB 24, the base plate 23 having the horizontal direction sensors 34 and the vertical direction sensors 55, the moving section 61*j* having the elastic components 25, and the upper part 22 of the first cabinet 10A are assembled in this order from the PCB 24.

The inputting device 61 provides plural input designating sections on the moving section 61*j*. Each of the input designating sections can be displaced about in the vertical direction. On the base plate 23, the vertical direction sensors 55, which detect the displacement of each of the input designating sections about in the vertical direction, are disposed on the base plate 23, in addition to the horizontal direction sensors 34.

Figure 19:
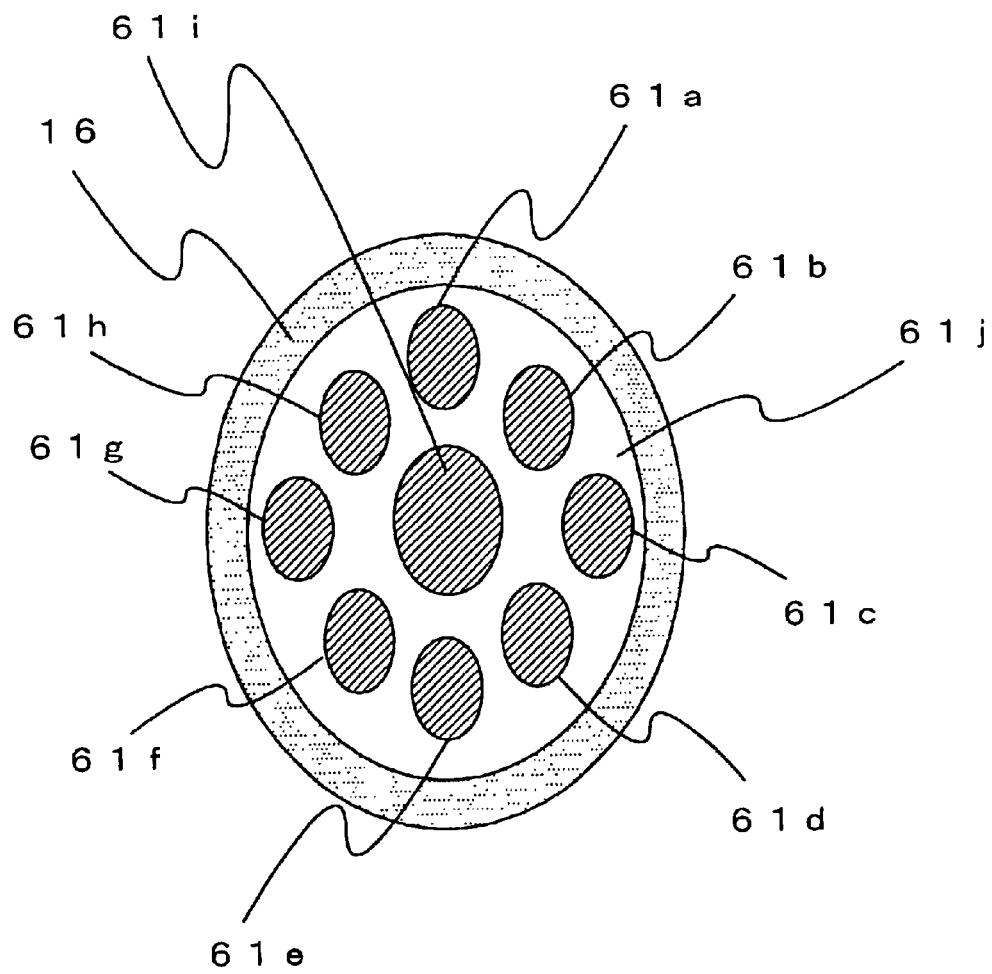
FIG. 19 is a plane view showing the shape of the inputting device, shown from the upper side, at the third embodiment of the electronic instrument of the present invention.

FIG. 19 is a plane view showing the shape of the inputting device 61, shown from the upper side, at the third embodiment of the electronic instrument of the present invention. Referring to FIG. 19, the structure and the operation of the inputting device 61 at the third embodiment of the electronic instrument of the present invention is explained.

The inputting device 61 provides input designating sections 61*a* to 61*i*, the moving section 61*j*, and the operating region 16, and the input designating sections 61*a* to 61*i* are disposed in the moving section 61*j*. The structure and the operation of the moving section 61*j* is almost equal to those of the moving sections 21 and 41 at the first and second embodiments. And the moving section 61*j* can move about in the horizontal direction within the operating region 16, and also can move about in the vertical direction.

The input designating section 61*i* is disposed at the center of the moving section 61*j* of the inputting device 61. The input designating sections 61*a* to 61*h* are disposed along the outer circle of the moving section 61*j* in the moving section 61*j*.

The input designating sections 61*a* to 61*i* and the moving section 61*j* can move about in the vertical direction independently one another. When each of the input designating sections 61*a* to 61*i* moves about in the vertical direction, each of the vertical direction sensors 55, corresponding to the moved input designating section, detects the movement and outputs a designated vertical direction detection signal. A CPU (not shown), which is disposed on the PCB 24 and controls signals, outputs a signal, which controls to display information on the display 11, to a display controlling section (not shown), based on an inputted vertical direction detection signal. The display controlling section controls the movement of a moving object on the display 11, based on the signal from the CPU. Therefore, the user can easily control the input (decision) of information on the display 11, by operating the input designating sections 61*a* to 61*i* and the moving section 61*j* by combining them.

The CPU can control the moving direction of the moving object and the decision of the information being selected by the moving object, based on the movement of each of the input designating sections 61*a* to 61*i*. For example, when a user pushed the input designating section 61*b* by using such as his/her fingertip, only the horizontal direction sensor, disposed in the direction where the pushed input designating section 61*b* is disposed, can detect the displacement of the moving section 61*j* about in the horizontal direction. That is, the detecting direction is decided by pushing one of the input designating sections. Or it is possible to make the moving section 61*j* move only about in the direction of the input designating section 61*b* by pushing the input designating section 61*b*. That is, by pushing one of the input designating sections, ON/OFF control of each of the horizontal direction sensors can be executed. In case that the moving object on the display 11 is moved to a designated direction, error operation, which makes the moving object move in the direction except the designated direction, can be prevented. Especially, when a user wants to move the moving object on the display 11 in the slanting direction for the X and Y directions, error operation making the moving object move in the X or Y direction can be prevented.

And in case that plural moving objects exist on the display 11, the plural moving objects can be controlled by combining the input designating sections 61*a* to 61*i* and the moving section 61*j*. For example, based on kinds of information being displayed on the display 11, the CPU allocates the moving section 61*j* to move the cursor, and allocates the input designating sections 61*a* to 61*h* to scroll the total screen. With the allocation by the CPU mentioned above, when plural moving objects are used, it is not necessary to change the plural moving objects to one of them, therefore, the operation ability can be increased at the inputting device. Further, the CPU can allocate roles to the moving section 61*j* and the input designating sections 61*a* to 61*h* in other ways being different from the way mentioned above, and also the user can allocate the roles to the moving section 61*j* and the input designating sections 61*a* to 61*h*. The input designating section 61*i* decides the information being selected by the moving object on the display 11.

At the third embodiment of the present invention, the input designating section 61*i* was disposed at the center of the moving section 61*j* and the input designating sections 61*a* to 61*h* are disposed along the outer circle of the moving section 61*j* in the moving section 61*j*, however the number and the positions of the input designating sections 61*a* to 61*h* are not limited to those mentioned above. Further each of the input designating sections can be disposed in the directions where each of the horizontal direction sensors is disposed as the origin is made to the reference, corresponding to the number of the horizontal direction sensors.

Figure 20:
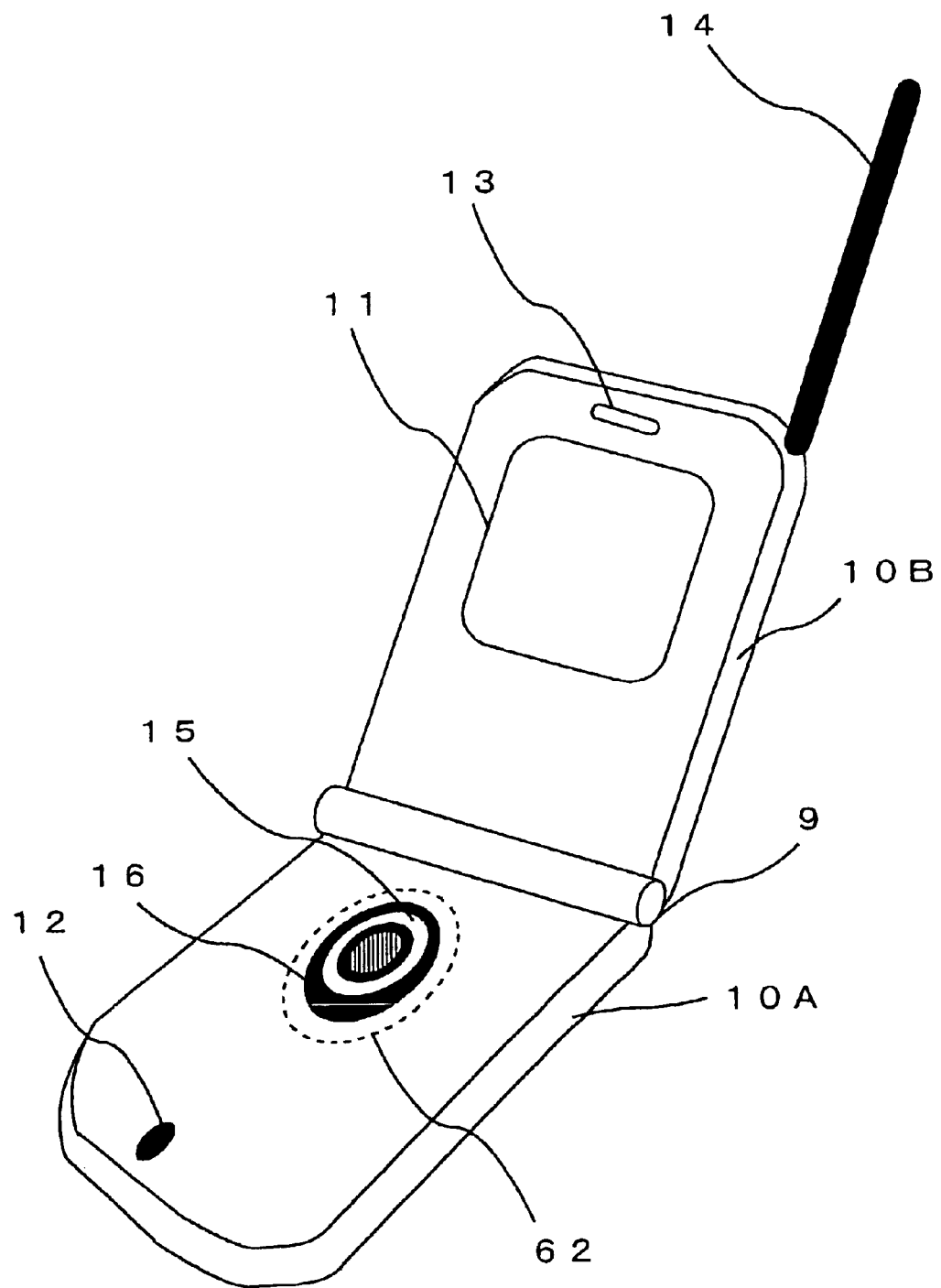
FIG. 20 is a perspective view showing an electronic instrument using an inputting device at a fourth embodiment of the present invention.

Next, referring to the drawings, a fourth embodiment of the present invention is explained. FIG. 20 is a perspective view showing an electronic instrument using an inputting device at the fourth embodiment of the present invention. In FIG. 20, a mobile communication terminal is shown as the electronic instrument. Each function at the fourth embodiment of the present invention has the same reference number as that at the first, second, and third embodiments, if the function is almost the same as that at the first, second, and third embodiments.

Figure 21:
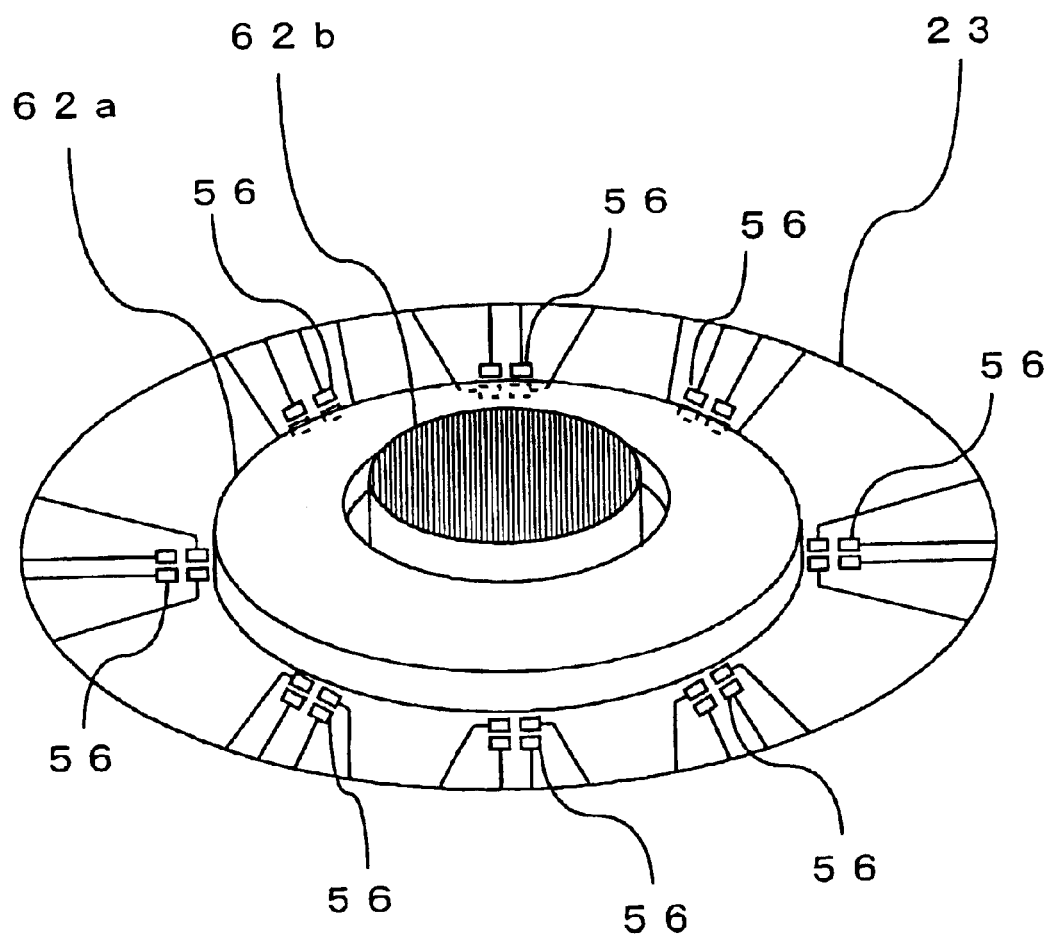
FIG. 21 is a perspective view showing a part of the inputting device at the fourth embodiment of the electronic instrument of the present invention.
Figure 22:
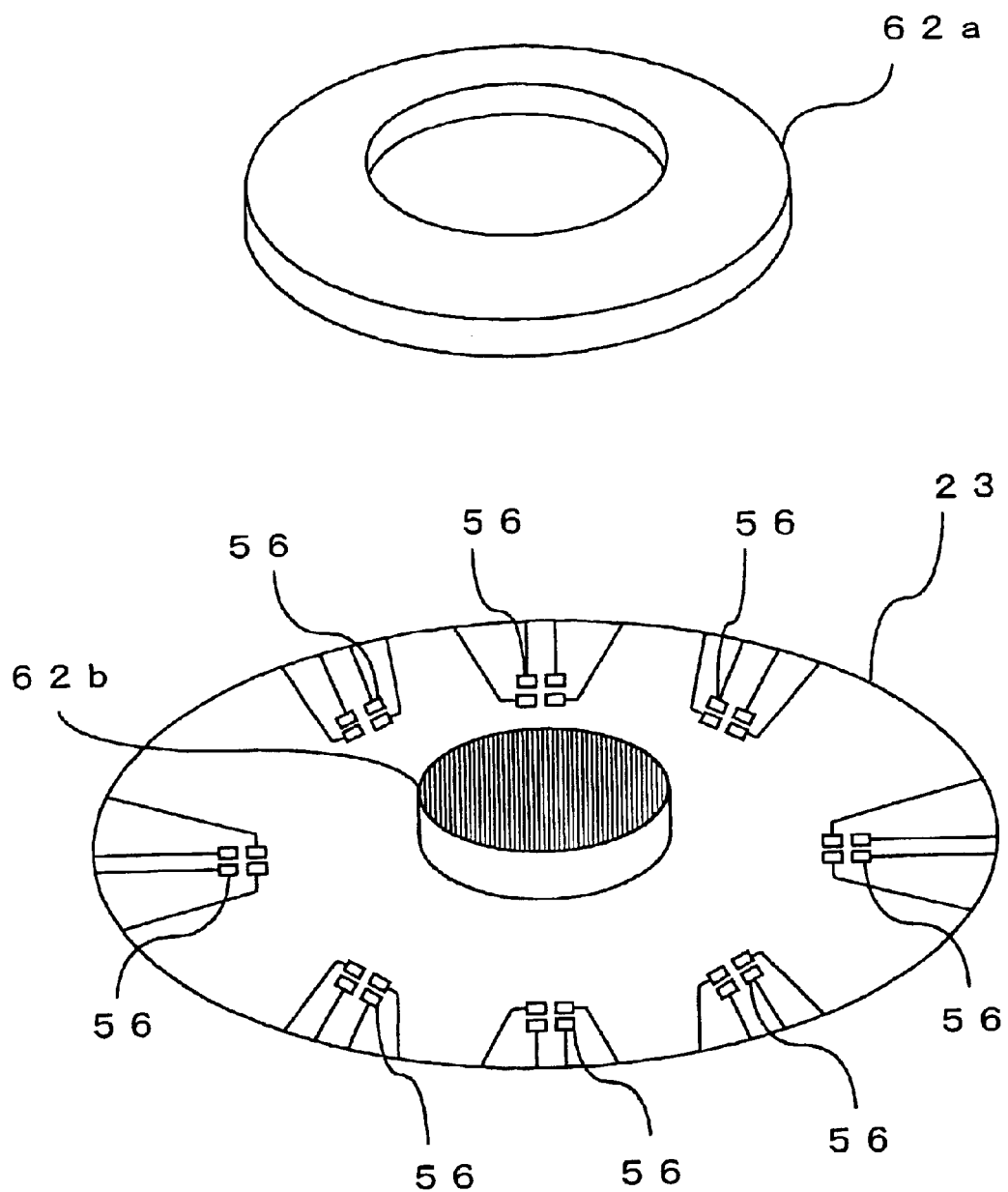
FIG. 22 is a perspective view showing a part of the inputting device, in which the part of the inputting device was disassembled and components in the inputting device are shown, at the fourth embodiment of the electronic instrument of the present invention.

At the inputting device 20 in the first embodiment of the present invention, the part moving about in the horizontal direction and the part moving about in the vertical direction are unified into one part. However, an inputting device 62 at the fourth embodiment of the present invention provides the part moving about in the horizontal direction and the part moving about in the vertical direction independently. FIG. 21 is a perspective view showing a part of the inputting device 62 at the fourth embodiment of the electronic instrument of the present invention. FIG. 22 is a perspective view showing a part of the inputting device 62, in which the part of the inputting device 62 was disassembled and components in the inputting device 62 are shown, at the fourth embodiment of the electronic instrument of the present invention.

Referring to FIGS. 20 to 22, the structure and the operation of the inputting device 62 at the fourth embodiment of the electronic instrument of the present invention are explained. As shown in FIGS. 21 and 22, the inputting device 62 provides moving sections 62*a* and 62*b*, a base plate 23, horizontal direction sensors 56. The moving section 62*a* has a plate shape, and an opening part is formed at the center of the moving section 62*a*. On the base plate 23, the moving section 62*b* and the horizontal direction sensors 56 are provided. The moving section 62*b* can move about in the vertical direction and does not move about in the horizontal direction. The moving section 62*a* is disposed on the base plate 23 so that the moving section 62*b* penetrates the opening part of the moving section 62*a*. The moving section 62*a* can move about in the horizontal direction on the base plate 23. The horizontal direction sensors 56 detect the displacement of the moving section 62*a* about in the horizontal direction.

At the fourth embodiment of the present invention, the movement control of the moving object on the display 11 is executed by the displacement of the moving section 62*a* about in the horizontal direction. And the input (decision) control of information being selected by the moving object on the display 11 is executed by the displacement of the moving section 62*b* about in the vertical direction, which is completely different from the displacement of the moving section 62*a* about in the horizontal direction. Therefore, an error input (decision) of information on the display 11 caused by error operation of the moving sections 62*a* and 62*b* can be prevented.

As shown in FIGS. 21 and 22, the eight horizontal direction sensors 56 are provided as the origin is made to the reference, however the number and the positions of the horizontal direction sensors are not limited to those mentioned above.

Figure 23:
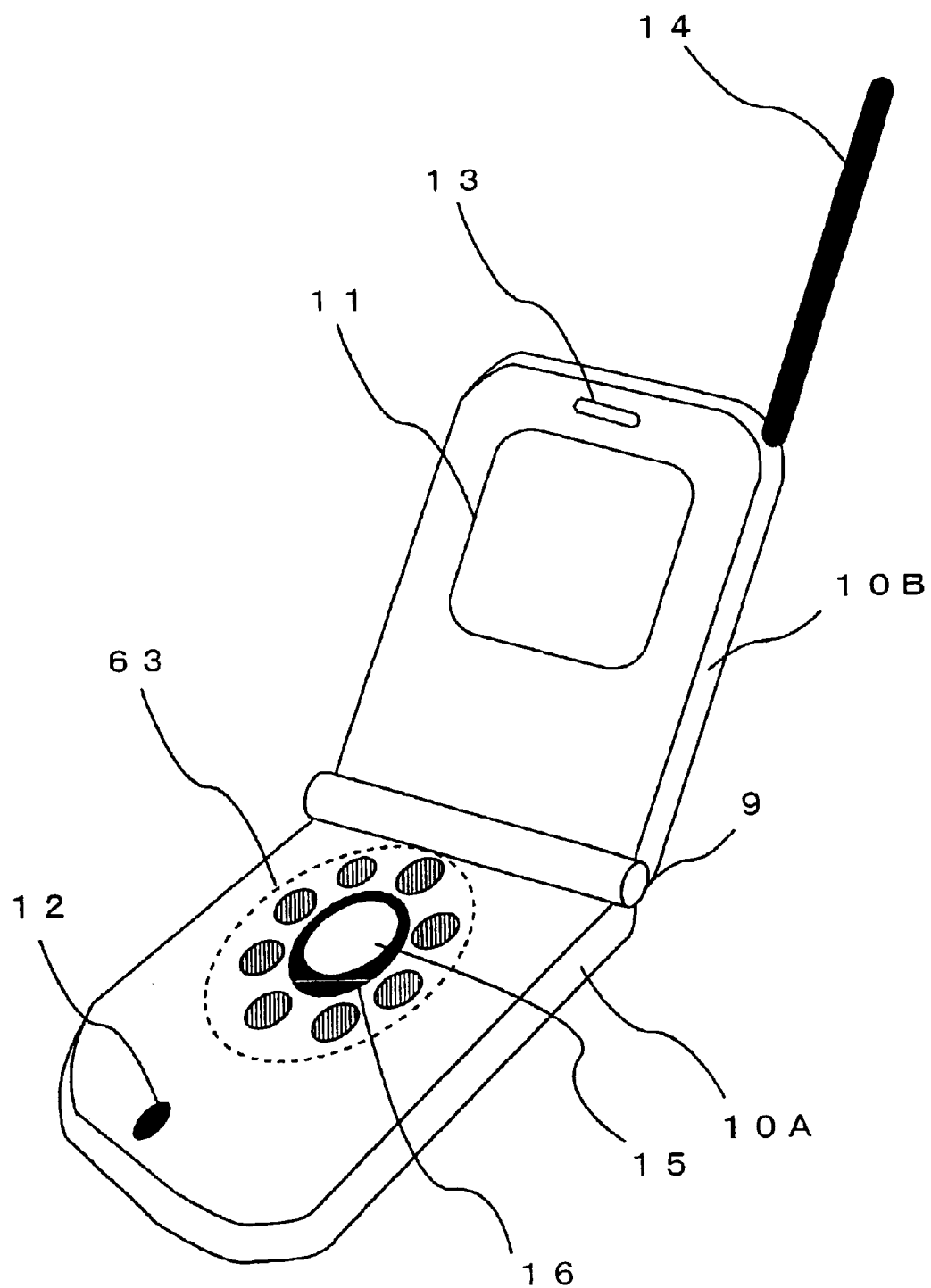
FIG. 23 is a perspective view showing an electronic instrument using an inputting device at a fifth embodiment of the present invention.

Next, referring to the drawings, a fifth embodiment of the present invention is explained. FIG. 23 is a perspective view showing an electronic instrument using an inputting device at the fifth embodiment of the present invention. In FIG. 23, a mobile communication terminal is shown as the electronic instrument. Each function at the fifth embodiment of the present invention has the same reference number as that at the first embodiment, if the function is almost the same as that at the first embodiment.

Figure 24:
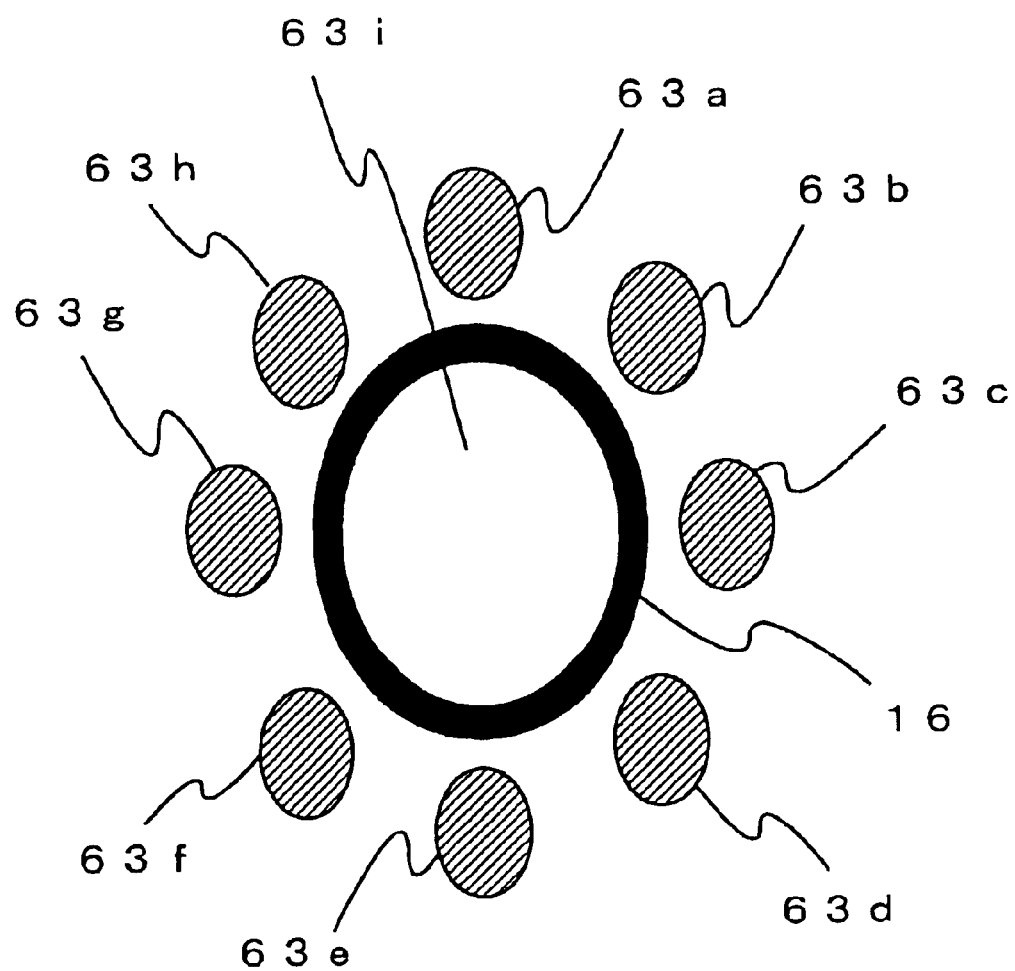
FIG. 24 is a plane view showing a part of the inputting device at the fifth embodiment of the electronic instrument of the present invention.

An inputting device 63 at the fifth embodiment, of the present invention provides input designating sections, in addition to the operating section 15 at the first embodiment of the present invention. FIG. 24 is a plane view showing a part of the inputting device 63 at the fifth embodiment of the electronic instrument of the present invention.

Referring to FIGS. 23 to 24, the structure and the operation of the inputting device 63 at the fifth embodiment of the electronic instrument of the present invention are explained. As shown in FIG. 24, the inputting device 63 provides input designating sections 63*a* to 63*h*, a moving section 63*i*, and an operating region 16. The structure and the operation of the moving section 63*i* are the same as those of the moving sections 21 and 41 at the first and second embodiments of the present invention. And the moving section 63*i* can move about in the horizontal direction within the operating region 16, and can also move about in the vertical direction.

The input designating sections 63*a* to 63*h* are disposed in the upper part 22 of the first cabinet 10A outside the operating region 16, independently of the moving section 63*i*. Each of the input designating sections 63*a* to 63*h* can move about in the vertical direction, independently of the moving section 63*i*, and also independently of one another. When each of the input designating sections 63*a* to 63*h* moves about in the vertical direction, each of vertical direction sensors (not shown), disposed in the input designating region, detects the movement of each of the input designating sections 63 *a* to 63*h*, and outputs a detected signal. A CPU outputs an instruction regarding information displaying on the display 11 to a display controlling section, based on the detected signal. The display controlling section controls the movement of the moving object on the display 11, based on the instruction mentioned above. Therefore, a user can easily decide the information on the display 11, by operating the input designating sections 63*a* to 63*h* and the moving section 63*i* by combining them.

The CPU can control the moving direction of the moving object based on the movement of each of the input designating sections 63*a* to 63*h*. For example, when a user pushed the input designating section 63*b* by using such as his/her fingertip, only the horizontal direction sensor, disposed in the direction where the pushed input designating section 63*b* is disposed, can detect the displacement of the moving section 63*i* about in the horizontal direction. That is, the detecting direction is decided by pushing one of the input designating sections. Or it is possible to make the moving section 63*i* move only about in the direction of the input designating section 63b by pushing the input designating section 63b. That is, by pushing one of the input designating sections, ON/OFF control of each of the horizontal direction sensors can be executed. In case that the moving object on the display 11 is moved to a designated direction, error operation, which makes the moving object move in the direction except the designated direction, can be prevented. Especially, when a user wants to move the moving object on the display 11 in the slanting direction for the X and Y directions, error operation making the moving object move in the X or Y direction can be prevented.

As the same as at the third embodiment of the present invention, plural moving objects on the display 11 can be easily moved by allocating each of the input designating sections 63a to 63h and the moving section 63i to each of the plural moving objects (cursor, total screen, information per page, and so forth).

Figure 25:
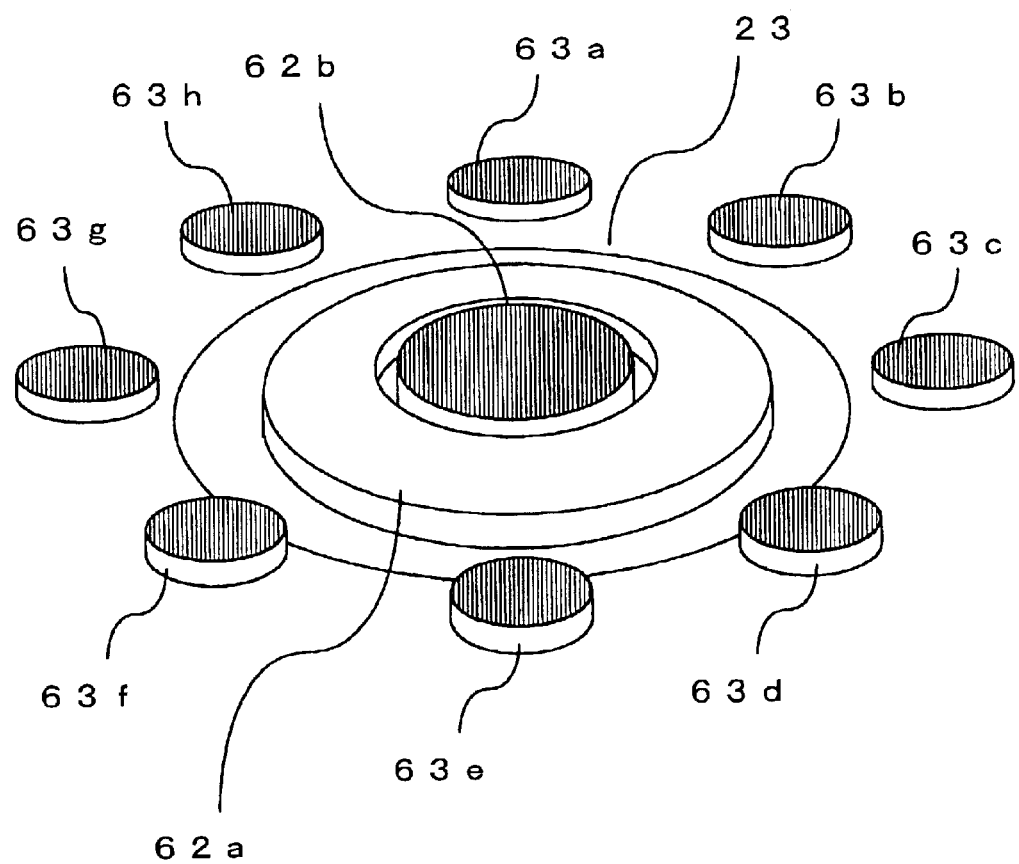
FIG. 25 is a perspective view showing a part of an inputting device at a modified example of the fifth embodiment of the electronic instrument of the present invention.

At the fifth embodiment of the present invention, the input designating sections 63a to 63h were disposed at the region surrounding the moving section 63i, which can move about in the horizontal and vertical directions. However, as explained in the fourth embodiment of the present invention, the input designating sections 63a to 63h can be disposed at a region surrounding a moving section in which a part displacing about in the horizontal direction and a part displacing about in the vertical direction are provided independently. FIG. 25 is a perspective view showing a part of an inputting device at a modified example of the fifth embodiment of the electronic instrument of the present invention.

Referring to FIG. 25, the modified example of the fifth embodiment of the present invention is explained. Each function at the modified example of the fifth embodiment of the electronic instrument of the present invention has the same reference number as that at the first and fourth embodiments, if the function is almost the same as that at the first and fourth embodiments.

As shown in FIG. 25, the inputting device provides moving sections 62a and 62b, a base plate 23, and input designating sections 63a to 63h. The moving section 62a has a plate shape, and an opening part is formed at the center of the moving section 62a. On the base plate 23, the moving section 62b is provided. The moving section 62b can move about in the vertical direction and does not move about in the horizontal direction. The moving section 62a is disposed on the base plate 23 so that the moving section 62b penetrates the opening part of the moving section 62a. The moving section 62a can move about in the horizontal direction on the base plate 23. The input designating sections 63a to 63h are disposed on the upper part 22 of the first cabinet 10A along the outer circle of the bottom surface of the moving section 62a independently of one another.

At the modified example of the fifth embodiment of the present invention, the movement control of the moving object on the display 11 is executed by the moving section 62a, as the same as by the moving section 62a at the fourth embodiment of the present invention. And the input (decision) of information being displayed on the display 11 is executed by the moving section 62b, as the same as by the moving section 62b at the fourth embodiment of the present invention.

As shown in FIGS. 24 and 25, at the fifth embodiment of the present invention, the eight input designating sections 63a to 63h were provided as the origin is made to be the reference, however the number and the positions of the input designating sections are not limited to those mentioned above. And each of the input designating sections is disposed in the direction where each of the horizontal direction sensors is disposed as the origin is made to be the reference, corresponding to the decided number.

Figure 26:
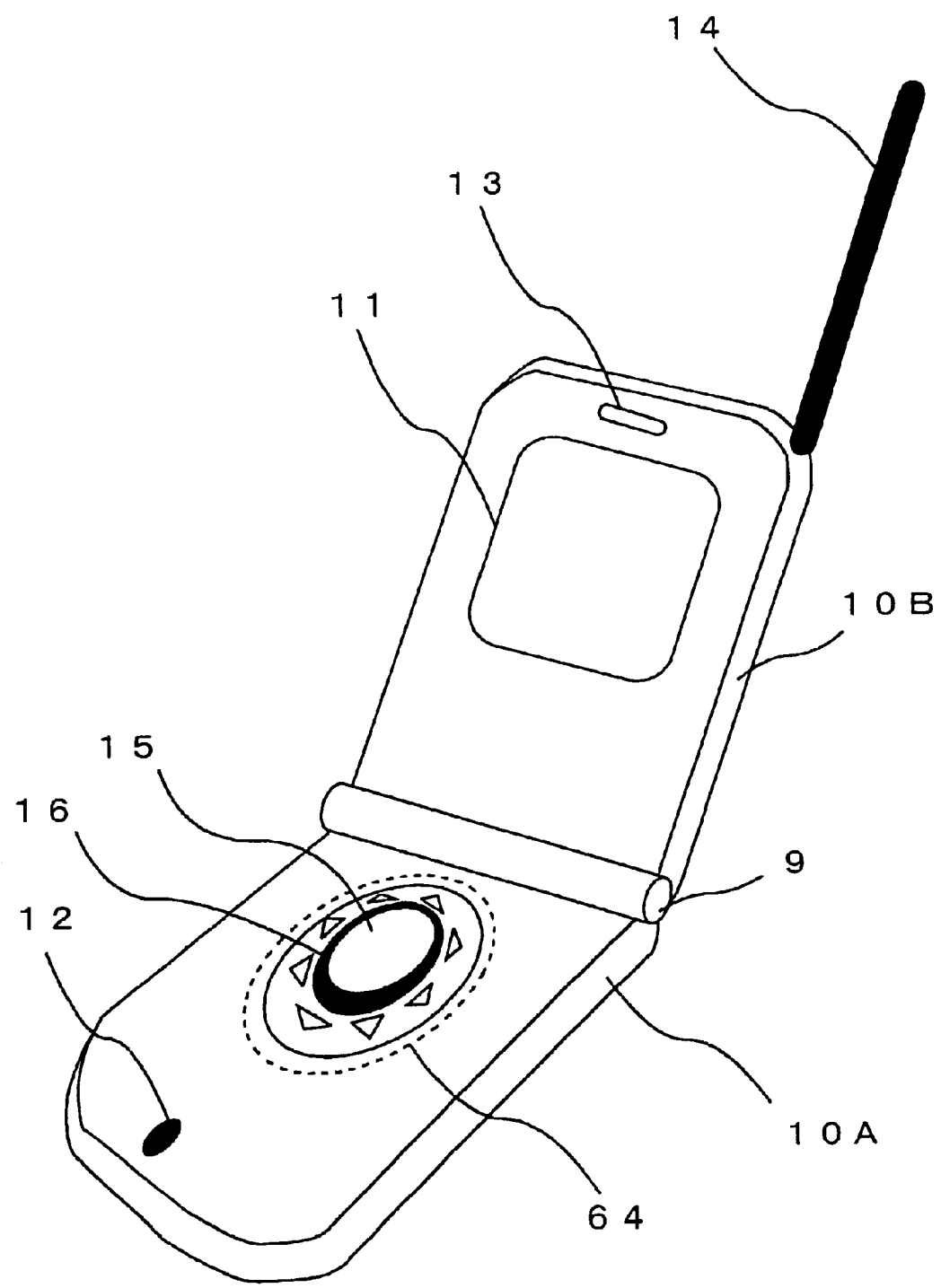
FIG. 26 is a perspective view showing an electronic instrument using an inputting device at a sixth embodiment of the present invention.

Next, referring to the drawings, a sixth embodiment of the present invention is explained. FIG. 26 is a perspective view showing an electronic instrument using an inputting device at the sixth embodiment of the present invention. In FIG. 26, a mobile communication terminal is shown as the electronic instrument. Each function at the sixth embodiment of the present invention has the same reference number as that at the first embodiment, if the function is almost the same as that at the first embodiment.

Figure 27:
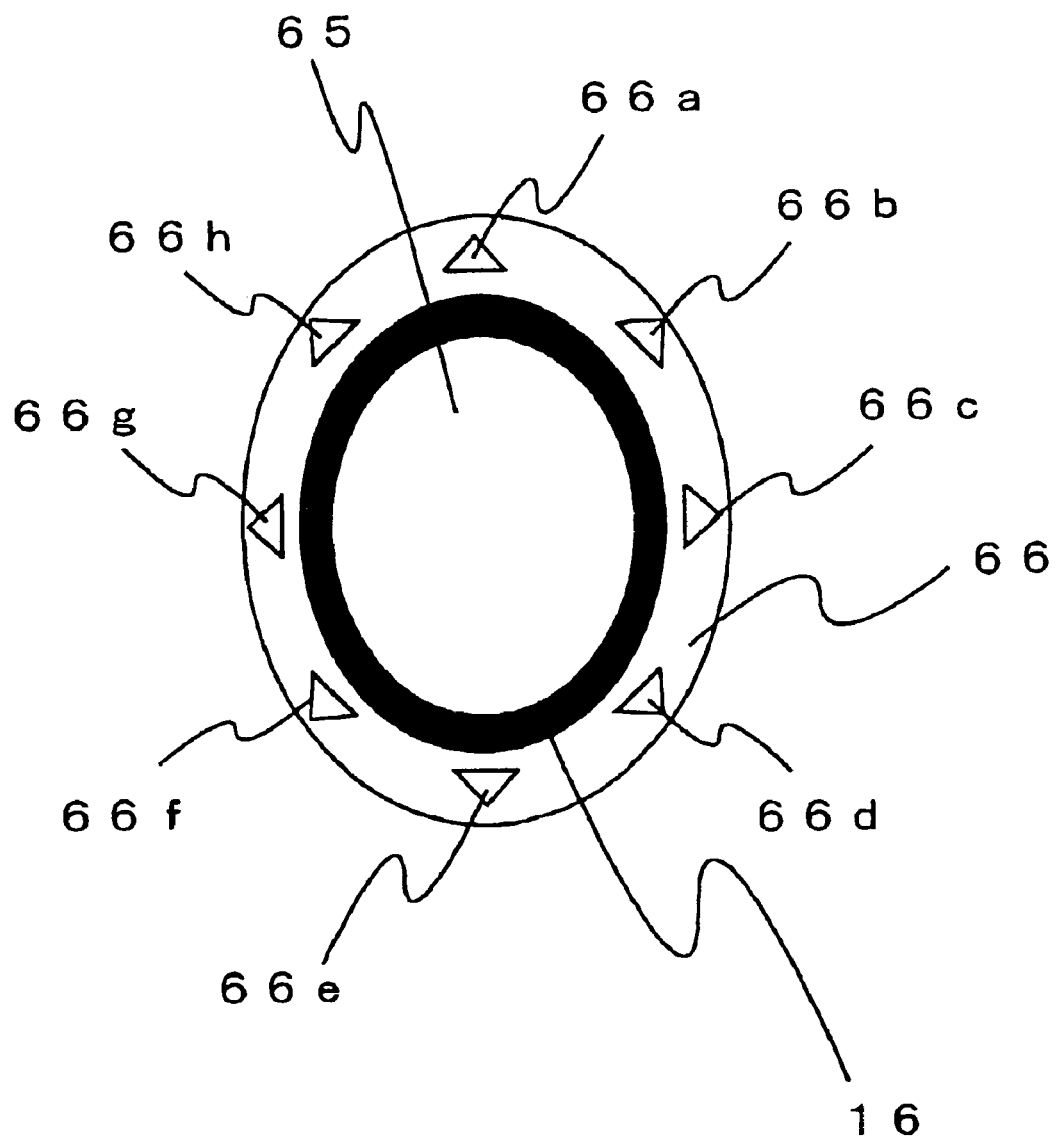
FIG. 27 is a plane view showing a part of the inputting device at the sixth embodiment of the electronic instrument of the present invention.

An inputting device 64 at the sixth embodiment of the present invention provides an input designating section, in addition to the operating section 15 at the first embodiment of the present invention. FIG. 27 is a plane view showing a part of the inputting device 64 at the sixth embodiment of the electronic instrument of the present invention.

Referring to FIGS. 26 to 27, the structure and the operation of the inputting device 64 at the sixth embodiment of the electronic instrument of the present invention are explained. As shown in FIG. 27, the inputting device 64 provides a moving section 65, an input designating section 66, and an operating region 16. The structure and the operation of the moving section 65 are the same as those of the moving sections 21 and 41 at the first and second embodiments of the present invention. And the moving section 65 can move about in the horizontal direction within the operating region 16, and can also move about in the vertical direction.

The input designating section 66 has a ring shape and is disposed at a region along the outer circle of the operating region 16 outside the operating region 16. The input designating section 66 can move about in the vertical direction independently of the moving section 65.

The surface of the input designating section 66 is divided into plural regions, and the divided plural regions are named as input designating sections 66a to 66h. When each of the input designating sections 66a to 66h is moved about in the vertical direction, each of vertical direction sensors (not shown), disposed in each of input designating regions, outputs a vertical direction detection signal by detecting the movement of each of the input designating sections 66a to 66h. A CPU outputs an instruction regarding the displaying information on the display 11 to a display controlling section, based on the detected signal. The display controlling section controls the movement of the moving object on the display 11, based on the instruction mentioned above. Therefore, a user can easily decide information on the display 11, by operating the input designating section 66 and the moving section 65 by combining them.

The CPU can control the moving direction of the moving object based on the movement of each of the input designating sections 66a to 66h. For example, when a user pushed the input designating section 66b by using such as his/her fingertip, only the horizontal direction sensor, disposed in the direction where the pushed input designating section 66b is disposed, can detect the displacement of the moving section 65 about in the horizontal direction. That is, the detecting direction is decided by pushing one of the input designating sections. Or it is possible to make the moving section 65 move only about in the direction of the input designating section 66b by pushing the input designating section 66b. That is, by pushing one of the input designating sections, ON/OFF control of each the horizontal direction sensors can be executed. In case that the moving object on the display 11 is moved to a designated direction, error operation, which makes the moving object move in the direction except the designated direction, can be prevented. Especially, when a user wants to move the moving object on the display 11 in the slanting direction for the X and Y directions, error operation making the moving object move in the X or Y direction can be prevented.

As the same as at the third embodiment of the present invention, plural moving objects on the display 11 can be easily moved by allocating each of the input designating sections 66a to 66h and the moving section 65 to each of the plural moving objects (cursor, total screen, information per page, and so forth).

Figure 28:
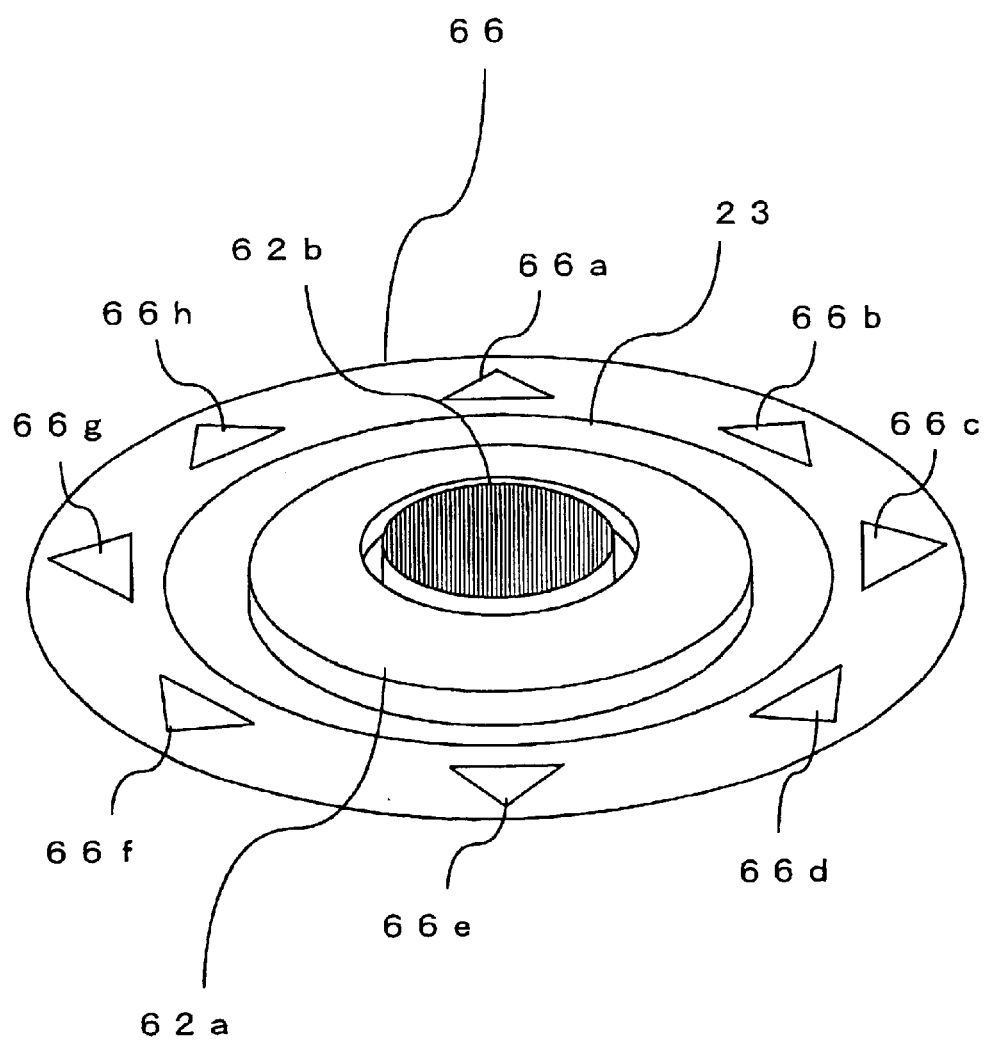
FIG. 28 is a perspective view showing a part of an inputting device at a modified example of the sixth embodiment of the electronic instrument of the present invention.

At the sixth embodiment of the present invention, the input designating sections 66 was disposed at the region surrounding the moving section 65, which can move about in the horizontal and vertical directions. However, as explained in the fourth embodiment of the present invention, the input designating section 66 can be disposed at a region surrounding a moving section in which a part displacing about in the horizontal direction and a part displacing about in the vertical direction are provided independently. FIG. 28 is a perspective view showing a part of an inputting device at a modified example of the sixth embodiment of the electronic instrument of the present invention.

Referring to FIG. 28, the modified example of the sixth embodiment of the present invention is explained. Each function at the modified example of the sixth embodiment of the present invention has the same reference number as that at the first and fourth embodiments, if the function is almost the same as that at the first and fourth embodiments.

As shown in FIG. 28, the inputting device provides moving sections 62a and 62b, a base plate 23, and an input designating section 66. The moving section 62a has a plate shape, and an opening part is formed at the center of the moving section 62a. On the base plate 23, the moving section 62b is disposed. The moving section 62b can move about in the vertical direction and does not move about in the horizontal direction. The moving section 62a is disposed on the base plate 23 so that the moving section 62b penetrates the opening part of the moving section 62a. The moving section 62a can move about in the horizontal direction on the base plate 23. The input designating section 66 is disposed along the outer circle of the bottom surface of the moving section 62a independently of each other. As shown in FIG. 28, the surface of the input designating section 66 is divided into plural regions, and the divided plural regions are named as input designating sections 66a to 66h.

At the modified example of the sixth embodiment of the present invention, the movement control of the moving object on the display 11 is executed by the moving section 62a, as the same as by the moving section 62a at the fourth embodiment of the present invention. And the input (decision) of information being displayed on the display 11 is executed by the moving section 62b, as the same as by the moving section 62b at the fourth embodiment of the present invention.

As shown in FIGS. 27 and 28, at the sixth embodiment of the present invention, the eight input designating sections 66a to 66h were formed on the input designating section 66. However the number and the positions of the input designating sections are not limited to those mentioned above. And each of the input designating sections is disposed in the direction where each of the horizontal direction sensors is disposed as the origin is made to be the reference, corresponding to the decided number.

At the embodiments of the present invention, each of the moving sections, each of the input designating sections, the operating region, and the base plate can be a disk shape, a polygonal shape, or another shape.

At an inputting method of information at an electronic instrument having an inputting device, the inputting method of information provides a process for displaying information on a display, a process for detecting the displacement of an operating section (moving section) about in the horizontal and vertical directions, a process for detecting the movement of each of input designating sections about in the vertical direction, a process for controlling the movement of a moving object based on the detected displacement of the operating section, a process for inputting (deciding) information being selected by the moving object, a process for controlling ON/OFF of the detecting direction of the displacement of the operating section based on the movement of each of the input designating sections, and a process for allocating the operating section and each of the input designating sections to each of moving objects to be controlled based on the displaying information in case that the plural moving objects exist. The processes mentioned above are executed by computer programs storing in the electronic instrument. However, the computer programs can be stored in recording media such as an optical disk and a magnetic disk, and can be loaded from one of the recording media. Or the computer programs can be loaded to the electronic instrument from an external instrument connecting to a network.

As mentioned above, according to the present invention, not only the displacement of the operating section in the X or Y direction (length or width direction), but also in the slanting direction for the X or Y direction can be detected. Therefore, the movement of a moving object on a display in the slanting direction for the X or Y direction can be controlled easily and precisely.

And according to the present invention, the control of the movement of the moving object on the display is executed by the displacement of the operating section about in the horizontal direction. And the control of the input (decision) of the information being selected by the moving object on the display is executed by the displacement of the operating section about in the vertical direction, being completely different from the direction of the displacement of the operating section about in the horizontal direction. Therefore, an error input (decision) on the display caused by error operation of the operating section can be prevented.

And according to the present invention, by disposing plural horizontal direction sensors in the same direction as the origin is made to be the reference, the moved distance of the operating section can be detected. Therefore, the moving object on the display can be controlled corresponding to the purposes. For example, the moving velocity of the moving object can be changed corresponding to the moved distance of the operating section. And in case that plural moving objects exist, it can be set what moving object is used corresponding to the moved distance of the operating section.

And according to the present invention, by using the operating section and the input designating sections by combining them, ON/OFF of each of the horizontal direction sensors can be controlled. Therefore, error operation about in the horizontal direction by the operating section can be prevented.

Further, according to the present invention, in case that plural moving object exist, the control for the plural moving objects can be allocated to the operating section and the input designating sections. Therefore, without changing the moving object to be controlled, the control for the plural moving objects can be executed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An inputting device, comprising:
   a first operating means, which is disposed on a surface having almost the same level of the surface of a cabinet and is displaced about in the horizontal direction along a plane being almost parallel to said surface of said cabinet and also is displaced about in the vertical direction for said surface of said cabinet;
   in case that orthogonal coordinates having X axis and Y axis are set on said plane being almost parallel to said surface of said cabinet,
   a displacement detecting means, which detects displacement of said first operating means in the X or Y direction and in the direction slanting for said X or Y direction as the origin of said orthogonal coordinates is made to be the reference;
   a signal outputting means, which outputs designated signals based on said displacement of said first operating section detected by said displacement detecting means; and
   a second operating means, which is disposed on said surface having almost the same level of said surface of said cabinet and has plural parts displacing about in the vertical direction independently of one another for said surface of said cabinet, wherein,
   said displacement detecting means decides whether the contact by said first operating means with said displacement detecting means is detected or not, based on displacement of said second operating means about in the vertical direction.

2. An inputting device in accordance with claim 1, wherein:
   said displacement detecting means detects said displacement of said first operating means about in said horizontal direction by one of sensors disposed in said X direction and said Y direction and in said direction slanting for said x direction and said Y direction as said origin is made to be the reference.

3. An inputting device in accordance with claim 1, wherein:
   said first operating means provides a displacing part, in which a part displacing about in the horizontal direction and a part displacing about in the vertical direction are unified, and said part displacing about in the horizontal direction and said part displacing about in the vertical direction are displaced independently of each other.

4. An inputting device in accordance with claim 1, wherein:
   said first operating means provides a part displacing about in the horizontal direction and a part displacing about in the vertical direction separately and said part displacing about in the horizontal direction and said part displacing about in the vertical direction are displaced independently of each other.

5. An inputting device in accordance with claim 1, wherein:
   said displacement detecting means is disposed in each of the plural directions on a plane being almost parallel to said surface of said cabinet as said origin is made to be the reference, and detects said displacement of said first operating means about in the horizontal direction by contacting said first operating means.

6. An inputting device in accordance with claim 1, further comprising:
   an origin returning means, which makes the center of said first operating means return to said origin, in case that force about in the horizontal direction is not being applied to said first operating means.

7. An inputting device in accordance with claim 6, wherein:
   said origin returning means makes said center of said first operating means return to said origin by using at least one elastic component having elastic force adhered to said first operating means.

8. An electronic instrument, comprising:
   a first operating means, which is disposed on a surface having almost the same level of the surface of a cabinet and is displaced about in the horizontal direction along a plane being almost parallel to said surface of said cabinet and also is displaced about in the vertical direction for said surface of said cabinet;
   in case that orthogonal coordinates having X axis and Y axis are set on said plane being almost parallel to said surface of said cabinet,
   a displacement detecting means, which detects displacement of said first operating means in the X or Y direction and in the direction slanting for said X or Y direction as the origin of said orthogonal coordinates is made to be the reference;
   a displaying means, which displays information;
   a controlling means, which controls a moving object on said displaying means based on the direction of said displacement of said first operating means detected by said displacement detecting means; and
   a second operating means, which is disposed on said surface having almost the same level of said surface of said cabinet and has plural parts displacing about in the vertical direction independently of one another for said surface of said cabinet, wherein,
   in case that said moving object is a cursor being displayed on said displaying means,
   said controlling means makes said cursor move in an arbitrary direction on said displaying means based on said displacement of said first operating means about in the horizontal direction or based on said displacement of said second operating means about in the vertical direction, and
   said controlling means decides information on said displaying means being selected by said cursor based on said displacement of said first operating means about in the vertical direction or based on said displacement of said second operating means about in the vertical direction.

9. An electronic instrument in accordance with claim 8, wherein:
   said displacement detecting means detects said displacement of said first operating means about in said horizontal direction by one of sensors disposed in said X direction and said Y direction and in said direction slanting for said X direction arid said Y direction as said origin is made to be the reference.

10. An electronic instrument in accordance with claim 8, wherein:

said first operating means provides a displacing part, in which a part displacing about in the horizontal direction and a part displacing about in the vertical direction are unified, and said part displacing about in the horizontal direction and said part displacing about in the vertical direction are displaced independently of each other.

11. An electronic instrument in accordance with claim 8, wherein:

said first operating means provides a part displacing about in the horizontal direction and a part displacing about in the vertical direction separately, and said part displacing about in the horizontal direction and said part displacing about in the vertical direction are displaced independently of each other.

12. An electronic instrument in accordance with claim 8, wherein:

said displacement detecting means is disposed in each of the plural directions on a plane being almost parallel to said surface of said cabinet as said origin is made to be the reference, and detects said displacement of said first operating means about in the horizontal direction by contacting said first operating means.

13. An electronic instrument in accordance with claim 12, wherein:

said controlling means decides moving velocity of said moving object based on the size of said displacement of said first operating means detected by said displacement detecting means.

14. An electronic instrument in accordance with claim 8, wherein:

in case that said moving object is a total screen being displayed on said displaying means, said controlling means makes said total screen scroll in an arbitrary direction on said displaying means based on said displacement of said first operating means about in the horizontal direction or based on said displacement of said second operating means about in the vertical direction, and said controlling means decides a screen in said total screen on said displaying means being scrolled in said arbitrary direction based on said displacement of said first operating means about in the vertical direction or based on said displacement of said second operating means about in the vertical direction.

15. An electronic instrument in accordance with claim 8, wherein:

said controlling means changes screen information to be displayed on said displaying means based on said displacement of said first operating means about in the horizontal direction or based on said displacement of said second operating means about in the vertical direction.

16. An electronic instrument in accordance with claim 8, wherein:

said displacement detecting means decides whether the contact by said first operating means with said displacement detecting means is detected or not, based on displacement of said second operating means about in the vertical direction.

17. An electronic instrument in accordance with claim 8, wherein:

in case that plural moving objects exist, said controlling means allocates each of said plural moving objects to be moved to said first operating means and said second operating means separately based on information contents to be displayed on said displaying means.

18. An electronic instrument in accordance with claim 8, further comprising:

an origin returning means, which makes the center of said first operating means return to said origin, in case that force about in the horizontal direction is not being applied to said first operating means.

19. An electronic instrument in accordance with claim 18, wherein:

said origin returning means makes said center of said first operating means return to said origin by using at least one elastic component having elastic force adhered to said first operating means.

20. An inputting method of information, by using a first operating section, which is disposed on a surface having almost the same level of the surface of a cabinet and is displaced on said surface having almost the same level of said surface of said cabinet, and also by using a displaying section, which displays information, comprising the steps of:

displacing said first operating section along a plane being almost parallel to said surface of said cabinet about in the horizontal direction, and displacing said first operating section about in the vertical direction for said surface of said cabinet;

in case that orthogonal coordinates having X axis and Y axis are set on said plane being almost parallel to said surface of said cabinet, detecting displacement of said first operating section in the X or Y direction and in the direction slanting for said X or Y direction as the origin of said orthogonal coordinates is made to be the reference;

controlling a moving object on said displaying section based on the detected direction of said displacement of said first operating section; and displacing a second operating section, which is disposed on said surface having almost the same level of said surface of said cabinet and has plural parts displacing about in the vertical direction independently of one another for said surface of said cabinet, wherein, in case that said moving object is a cursor being displayed on said displaying section, said controlling said moving object makes said cursor move in an arbitrary direction on said displaying section based on said displacement of said first operating section about in the horizontal direction or based on said displacement of said second operating section about in the vertical direction, and said controlling said moving object decides information on said displaying section being selected by said cursor based on said displacement of said first operating section about in the vertical direction or based on said displacement of said second operating section about in the vertical direction.

21. An inputting method of information in accordance with claim 20, wherein: said detecting said displacement of said first operating section about in said horizontal direction is executed by using one of sensors disposed in said X direction and said Y direction and in said direction slanting for said X direction and said Y direction as said origin is made to be the reference.

22. An inputting method of information in accordance with claim 20, wherein:

said displacing said first operating section is executed by displacing said first operating section, in which a part displacing about in the horizontal direction and a part displacing about in the vertical direction are unified and said part displacing about in the horizontal direction and said part displacing about in the vertical direction are displaced independently of each other.

23. An inputting method of information in accordance with claim 20, wherein:

said displacing said first operating section is executed by displacing said first operating section, in which a part displacing about in the horizontal direction and a part displacing about in the vertical direction exist separately, and said part displacing about in the horizontal direction and said part displacing about in the vertical direction are displaced independently of each other.

24. An inputting method of information in accordance with claim 20, wherein:

said detecting said displacement of said first operating section about in the horizontal direction is executed by that each of displacement detecting sections, disposed in the plural directions on a plane being almost parallel to said surface of said cabinet as said origin is made to be the reference, contacts said first operating section.

25. An inputting method of information in accordance with claim 24, wherein:

said controlling said moving object decides moving velocity of said moving object based on the size of said detected displacement of said first operating section.

26. An inputting method of information in accordance with claim 20, wherein:

in case that said moving object is a total screen being displayed on said displaying section, said controlling said moving object makes said total screen scroll in an arbitrary direction on said displaying section based on said displacement of said first operating section about in the horizontal direction or based on said displacement of said second operating section about in the vertical direction, and said controlling said moving object decides a screen in said total screen on said displaying section being scrolled in said arbitrary direction based on said displacement of said first operating section about in the vertical direction or based on said displacement of said second operating section about in the vertical direction.

27. An inputting method of information in accordance with claim 20, wherein:

said controlling said moving object changes screen information to be displayed on said displaying section based on said displacement of said first operating section about in the horizontal directly or based on said displacement of said second operating section about in the vertical direction.

28. An inputting method of information in accordance with claim 20, wherein:

said detecting said displacement decides whether the contact by said first operating section with one of said displacement detecting sections is detected or not, based on displacement of said second operating section about in the vertical direction.

29. An inputting method of information in accordance with claim 20, wherein:

in case that plural moving objects exist, said controlling said moving object allocates each of said plural moving objects to be moved to said first operating section and said second operating section separately based on information contents to be displayed on said displaying section.

30. An inputting method of information in accordance with claim 20, further comprising the step of:

returning to said origin, which makes the center of said first operating section return to said origin, in case that force about in the horizontal direction is not being applied to said first operating section.

31. An inputting method of information in accordance with claim 30, wherein:

said returning to said origin makes said center of said first operating section return to said origin by using at least one elastic component having elastic force adhered to said first operating section.

\* \* \* \* \*